US010683010B2

(12) United States Patent
Takahashi et al.

(10) Patent No.: US 10,683,010 B2
(45) Date of Patent: Jun. 16, 2020

(54) DRIVE MODE SWITCHING DEVICE OF FOUR-WHEEL-DRIVE VEHICLE

(71) Applicant: TOYOTA JIDOSHA KABUSHIKI KAISHA, Toyota-shi, Aichi (JP)

(72) Inventors: Akinori Takahashi, Toyota (JP); Terumichi Asai, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 64 days.

(21) Appl. No.: 16/051,908

(22) Filed: Aug. 1, 2018

(65) Prior Publication Data

US 2019/0039621 A1 Feb. 7, 2019

(30) Foreign Application Priority Data

Aug. 1, 2017 (JP) ................................. 2017-149458

(51) Int. Cl.
| | | |
|---|---|---|
| *B60W 30/18* | (2012.01) | |
| *B60W 10/119* | (2012.01) | |
| *B60K 23/08* | (2006.01) | |
| *F16D 21/00* | (2006.01) | |
| *F16D 23/02* | (2006.01) | |

(52) U.S. Cl.
CPC ... *B60W 30/18181* (2013.01); *B60K 23/0808* (2013.01); *B60W 10/119* (2013.01); *B60K 2023/0825* (2013.01); *B60K 2023/0858* (2013.01); *B60W 2300/18* (2013.01); *F16D 21/00* (2013.01); *F16D 23/02* (2013.01)

(58) Field of Classification Search
None
See application file for complete search history.

(56) References Cited

U.S. PATENT DOCUMENTS

| | | | |
|---|---|---|---|
| 2016/0107523 A1 | 4/2016 | Maeda et al. | |
| 2016/0193917 A1* | 7/2016 | Horiike | B60K 17/3515 |
| | | | 701/54 |
| 2017/0182887 A1* | 6/2017 | Ogawa | B60K 23/08 |

FOREIGN PATENT DOCUMENTS

| | | |
|---|---|---|
| JP | 2015-229366 A | 12/2015 |
| WO | 2015/028874 A1 | 3/2015 |

* cited by examiner

*Primary Examiner* — Timothy Hannon
(74) *Attorney, Agent, or Firm* — Oliff PLC

(57) ABSTRACT

In a four-wheel-drive vehicle having auxiliary drive wheels to which power of a drive power source is transmitted via a transmission member, in which connecting/disconnecting devices are provided between the drive power source and the transmission member and between the transmission member and the auxiliary drive wheels such that one of the connecting/disconnecting devices is a friction engagement clutch while the other is a dog clutch, when switching from two-wheel-drive running mode in which both the clutches are disconnected to four-wheel-drive running mode, an acceleration/deceleration adaptive synchronization portion sets an allowable deceleration based on a vehicle acceleration/deceleration and controls an engagement torque of the friction engagement clutch to make the deceleration of the vehicle equal to the allowable deceleration when the rotation speed of the transmission member is increased.

6 Claims, 9 Drawing Sheets

DRIVE MODE SWITCHING DEVICE OF FOUR-WHEEL-DRIVE VEHICLE

This application claims priority from Japanese Patent Application No. 2017-149458 filed on Aug. 1, 2017, the disclosure of which is herein incorporated by reference in its entirety.

TECHNICAL FIELD

The present invention relates to a four-wheel-drive vehicle and, more particularly, to a drive mode switching device switching to four-wheel-drive running mode in which four wheels including auxiliary drive wheels are driven during two-wheel-drive running mode in which only main drive wheels are rotationally driven while both a friction engagement clutch and a dog clutch disposed before and after a transmission member transmitting power toward the auxiliary drive wheels are disconnected.

BACKGROUND ART

A four-wheel-drive vehicle is known that has a pair of left and right main drive wheels to which power of a drive power source is transmitted and a pair of left and right auxiliary drive wheels to which a portion of the power of the drive power source is transmitted via a transmission member during four-wheel-drive running mode. Regarding such a four-wheel-drive vehicle, a drive mode switching device is proposed and (a) the drive mode switching device has a first connecting/disconnecting device connecting and disconnecting power transmission between the drive power source and the transmission member and a second connecting/disconnecting device connecting and disconnecting power transmission between the transmission member and the auxiliary drive wheels such that one of the first and second connecting/disconnecting devices is a friction engagement clutch capable of adjusting an engagement torque while the other is a dog clutch, and (b) the drive mode switching device comprises a four-wheel switching control portion that controls the engagement torque of the friction engagement clutch when switching to four-wheel-drive running mode in which four wheels including the auxiliary drive wheels are driven during two-wheel-drive running mode in which only the main drive wheels are rotationally driven with both the friction engagement clutch and the dog clutch disconnected and thereby increases the rotation speed of the transmission member to connect the dog clutch after synchronization in which a differential rotation speed of the dog clutch becomes equal to or less than a predetermined value. A four-wheel-drive vehicle described in Patent Document 1 is an example thereof, and since the rotation of the transmission member (a front propeller shaft 13) is stopped during the two-wheel-drive running mode, excellent fuel consumption performance can be obtained. Additionally, in Patent Document 1, to suppress a deceleration shock (change in vehicle acceleration/deceleration) due to a rotational load of the transmission member at the time of synchronous control of increasing the rotation speed of the transmission member (the front propeller shaft 13) by controlling the engagement torque of the friction engagement clutch (an electric control coupling 12), a target synchronization time is set based on an accelerator operation amount, a vehicle speed, or a steering angle, and the engagement torque of the friction engagement clutch is controlled such that the synchronization is achieved in the target synchronization time.

PRIOR ART DOCUMENT

Patent Document

Patent Document 1: Japanese Laid-Open Patent Publication No. 2015-229366

SUMMARY OF THE INVENTION

Technical Problem

However, even such a drive mode switching device may cause a driver to feel discomfort due to a slight deceleration shock at the time of synchronous control during constant speed running at a substantially constant vehicle speed, for example. If the synchronization time is lengthened, the deceleration shock from a rotational load is reduced; however, this may increase a time required for shifting to the four-wheel-drive running mode and make a behavior of a vehicle unstable due to a slip etc., so that the device still has room for improvement.

The present invention was conceived in view of the situations and it is therefore an object of the present invention to more properly control the engagement torque of the friction engagement clutch at the time of switching from the two-wheel-drive running mode to the four-wheel-drive running mode to suppress the deceleration shock at the time of synchronous control causing the driver to feel discomfort and the unstable vehicle behavior due to an increased synchronization time.

Solution to Problem

To achieve the above object, a first aspect of the present invention provides a drive mode switching device of a four-wheel-drive vehicle applied to a four-wheel-drive vehicle having (a) a pair of left and right main drive wheels to which power of a drive power source is transmitted and a pair of left and right auxiliary drive wheels to which a portion of the power of the drive power source is transmitted via a transmission member during four-wheel-drive running mode, the drive mode switching device having (b) a first connecting/disconnecting device connecting and disconnecting power transmission between the drive power source and the transmission member and a second connecting/disconnecting device connecting and disconnecting power transmission between the transmission member and the auxiliary drive wheels such that one of the first and second connecting/disconnecting devices is a friction engagement clutch capable of adjusting an engagement torque while the other is a dog clutch, the drive mode switching device comprising: (c) a four-wheel switching control portion that controls the engagement torque of the friction engagement clutch when switching to four-wheel-drive running mode in which four wheels including the auxiliary drive wheels are driven during two-wheel-drive running mode in which only the main drive wheels are rotationally driven with both the friction engagement clutch and the dog clutch disconnected and that thereby increases a rotation speed of the transmission member to connect the dog clutch after synchronization in which a differential rotation of the dog clutch becomes equal to or less than a predetermined value, wherein (d) the four-wheel switching control portion comprises an acceleration/deceleration adaptive synchronization portion setting an allowable deceleration based on a vehicle acceleration/deceleration that is at least one of acceleration and deceleration of the vehicle and controlling an engagement torque of the friction engagement clutch to make the deceleration of the vehicle equal to the allowable deceleration when the rotation speed of the transmission member is increased.

The deceleration of the vehicle at the time of increasing the rotation speed of the transmission member means an increase in deceleration during deceleration running and a decrease in acceleration during acceleration running.

A second aspect of the present invention provides the drive mode switching device of a four-wheel-drive vehicle recited in the first aspect of the invention, wherein the acceleration/deceleration adaptive synchronization portion obtains the allowable deceleration from a relationship predefined such that the allowable deceleration increases when the vehicle acceleration/deceleration is large as compared to when the vehicle acceleration/deceleration is small.

A third aspect of the present invention provides the drive mode switching device of a four-wheel-drive vehicle recited in the first or second aspect of the invention, wherein the four-wheel switching control portion comprises a behavior stabilization priority synchronization portion that terminates the engagement torque control of the friction engagement clutch by the acceleration/deceleration adaptive synchronization portion under a predetermined condition at the time of a slip of the main drive wheels and that controls the engagement torque of the friction engagement clutch to synchronize the dog clutch in a synchronization time or a synchronization speed prioritizing behavior stabilization of the vehicle.

The slip in this description means a spin (idle running) during driving running in starting of the vehicle, for example.

A fourth aspect of the present invention provides the drive mode switching device of a four-wheel-drive vehicle recited in the third aspect of the invention, wherein the behavior stabilization priority synchronization portion comprises (a) a first synchronization time calculating portion calculating a first synchronization time for synchronizing the dog clutch through the engagement torque control of the friction engagement clutch by the acceleration/deceleration adaptive synchronization portion, and (b) a second synchronization time setting portion determining a second synchronization time necessary for behavior stabilization based on an operating state of the vehicle including the slip, and wherein (c) if the second synchronization time is shorter than the first synchronization time, the behavior stabilization priority synchronization portion terminates the engagement torque control of the friction engagement clutch by the acceleration/deceleration adaptive synchronization portion and controls the engagement torque of the friction engagement clutch to synchronize the dog clutch in the second synchronization time.

A fifth aspect of the present invention provides the drive mode switching device of a four-wheel-drive vehicle recited in any one of the first to fourth aspects of the invention, wherein (a) a first transmission shaft transmitting the power of the drive power source to the main drive wheels and a second transmission shaft transmitting a portion of the power of the drive power source to the auxiliary drive wheels are arranged parallel to each other along a front-back direction, wherein the second transmission shaft is the transmission member, wherein (b) a drive gear is relatively rotatably disposed on the first transmission shaft while a driven gear coupled to the drive gear via a chain is relatively non-rotatably disposed on the second transmission shaft, wherein (c) the first connecting/disconnecting device is a friction engagement clutch disposed between the drive gear and the first transmission shaft and connects the second transmission shaft via the first transmission shaft to the drive power source, and wherein (d) the second connecting/disconnecting device is a dog clutch disposed between either of the left and right auxiliary drive wheels and a differential gear device distributing the rotation of the second transmission shaft to the left and right auxiliary drive wheels.

Advantageous Effects of Invention

In the drive mode switching device of the four-wheel-drive vehicle, when the two-wheel-drive running mode is switched to the four-wheel-drive running mode, the acceleration/deceleration adaptive synchronization portion sets the allowable deceleration based on the vehicle acceleration/deceleration to control the engagement torque of the friction engagement clutch such that the deceleration of the vehicle becomes equal to the allowable deceleration at the time of the synchronous control of increasing the rotation speed of the transmission member, and therefore, the synchronous control is properly provided according to the vehicle acceleration/deceleration. Specifically, according to the experiments by the present inventors, when the vehicle acceleration/deceleration is large, the driver becomes insensitive to the deceleration shock (change in acceleration/deceleration) at the time of synchronous control and is less likely to feel discomfort as compared to when the vehicle acceleration/deceleration is small, and therefore, for example, while the allowable deceleration is reduced to suppress the deceleration shock during constant speed running with small vehicle acceleration/deceleration, the allowable deceleration is increased to shorten the synchronization time during acceleration/deceleration running with large vehicle acceleration/deceleration when the deceleration shock is hardly felt, so that the shift to the four-wheel-drive running mode can promptly be achieved to properly suppress the disturbance of vehicle behavior caused by a slip etc.

In the second aspect of the invention, the acceleration/deceleration adaptive synchronization portion obtains the allowable deceleration from the relationship predefined such that the allowable deceleration increases when the vehicle acceleration/deceleration is large as compared to when the vehicle acceleration/deceleration is small. Thus, the allowable deceleration becomes small during constant speed running at a substantially constant vehicle speed so that the engagement torque of the friction engagement clutch is controlled to make the deceleration of the vehicle smaller at the time of the synchronous control and, therefore, a reduction in the deceleration shock leads to an improvement in drivability, and the driver is less likely to feel discomfort. When the allowable deceleration is small, the synchronization time, i.e., the time required for shifting to the four-wheel-drive running mode, becomes long; however, since the urgency of shifting to the four-wheel-drive running mode is generally low during the constant speed running, it is considered that an increase in the synchronization time is less problematic. On the other hand, since the allowable deceleration is increased at the time of the acceleration/deceleration running of the vehicle when the driver hardly perceives the deceleration shock so that the switching to the four-wheel-drive running mode is promptly made due to a shortened synchronization time, the disturbance of the vehicle behavior attributable to a slip etc. can quickly be eliminated, and an excellent drive power performance can be ensured. When the allowable deceleration increases, the deceleration shock at the time of the synchronous control accordingly becomes larger, however, since the original vehicle acceleration/deceleration is large, the driver is less likely to feel discomfort.

In the third aspect of the invention, since the engagement torque control of the friction engagement clutch by the acceleration/deceleration adaptive synchronization portion is terminated under the predetermined condition at the time of a slip of the main drive wheels, and the engagement torque of the friction engagement clutch is controlled to synchronize the dog clutch in the synchronization time or the synchronization speed prioritizing the behavior stabilization of the vehicle. This can properly prevent the synchronization time, i.e., the time required for shifting to the four-wheel-drive running mode, from becoming longer at the time of a slip of the main drive wheels, and the vehicle behavior from becoming unstable due to lengthening of the slip state.

In the fourth aspect of the invention, the first synchronization time is calculated for synchronizing the dog clutch through the engagement torque control of the friction engagement clutch by the acceleration/deceleration adaptive synchronization portion while the second synchronization time necessary for behavior stabilization is set based on the operating state of the vehicle including the slip of the main drive wheels, and if the second synchronization time is shorter than the first synchronization time, the engagement torque of the friction engagement clutch is controlled to synchronize the dog clutch within the second synchronization time. This can properly prevent the synchronization time, i.e., the time required for shifting to the four-wheel-drive running mode, from becoming longer at the time of a slip of the main drive wheels, and the vehicle behavior from becoming unstable due to lengthening of the slip state.

In the fifth aspect of the invention, the first transmission shaft and the second transmission shaft (transmission member) arranged parallel with each other along the front-back direction of the vehicle are included such that power is transmitted via the dive gear, the chain, and the driven gear from the first transmission shaft to the second transmission shaft, and the friction engagement clutch is disposed between the drive gear and the first transmission shaft while the dog clutch is disposed between the differential gear device distributing the rotation of the second transmission shaft to the left and right auxiliary drive wheels and the auxiliary drive wheels, and in this case, when the two-wheel-drive running mode is switched to the four-wheel-drive running mode, the dive gear, the chain, the driven gear, the second transmission shaft, and the differential gear device must rotationally be driven by the engagement torque of the friction engagement clutch, so that the inertia thereof may cause a significant deceleration shock. Therefore, by applying any of the first to fourth aspects of the invention, the deceleration shock can be suppressed to improve the drivability while the shift to the four-wheel-drive running mode can promptly be made at the time of acceleration/deceleration of the vehicle to stabilize the vehicle behavior, so that the effects of the first to fourth aspects of the invention can properly be produced.

MODES FOR CARRYING OUT THE INVENTION

Figure 1:
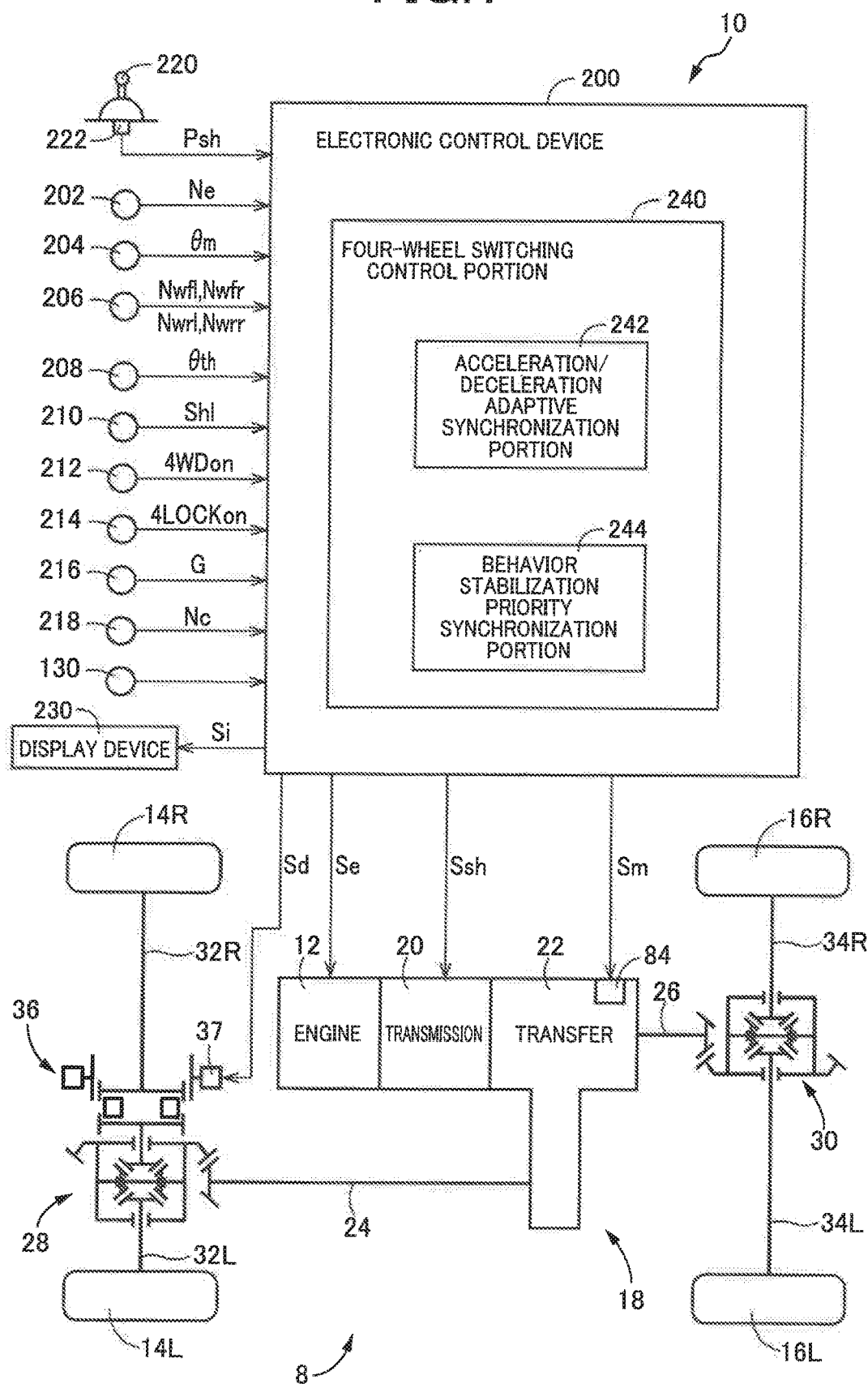
FIG. 1 is a skeleton diagram for explaining a general configuration of a drive system of a four-wheel-drive vehicle including a drive mode switching device according to an example of the present invention, also showing a main portion of a control system for switching a drive mode.

A drive power source may be an internal combustion engine such as a gasoline engine and a diesel engine or may be an electric motor, or a hybrid drive power source including both may be adopted. The power of the drive power source is transmitted to an input member of a transfer via a transmission, for example, and is transmitted from the input member to a first transmission shaft; however, the transmission can be omitted depending on the drive power source, and the first transmission shaft may also serve as the input member, so that various other forms are available. A second transmission shaft (transmission member) is connected to the first transmission shaft via a first connecting/disconnecting device, for example, or can be connected to an input member etc. via the first connecting/disconnecting device. One of the first and second connecting/disconnecting devices may be a friction engagement clutch and the other may be a dog clutch. Specifically, the first connecting/disconnecting device and the second connecting/disconnecting device may be a friction engagement clutch and a dog clutch, respectively, or the first connecting/disconnecting device and the second connecting/disconnecting device may be a dog clutch and a friction engagement clutch, respectively. The dog clutch may include a synchronization mechanism such as a synchronizer ring or may not include the synchronization mechanism. The first transmission shaft and the second transmission shaft transmit a drive power to one and the other of front and rear wheels, and the first transmission shaft and the second transmission shaft may be on the front wheel side and the rear wheel side, respectively, or the first transmission shaft and the second transmission shaft may be on the rear wheel side and the front wheel side, respectively. Power may be transmitted from the drive power source and the transmission etc. via a differential gear device directly to a pair of left and right main drive wheels, and the power may be transmitted from a differential case etc. of the differential gear device via the first connecting/disconnecting device and the transmission member (the second transmission shaft) to auxiliary drive wheels.

An acceleration/deceleration adaptive synchronization portion controls an engagement torque of the friction engagement clutch, i.e., a pressing force against a friction material, depending on an allowable deceleration set based on a vehicle acceleration/deceleration that is at least one of acceleration and deceleration of a vehicle and, when the allowable deceleration is large, since the friction engagement clutch can be engaged at a large engagement torque to promptly increase the rotation speed of the transmission member, the dog clutch is synchronized in a short time so that the synchronization time is shortened, and the dog clutch can subsequently be engaged for promptly shifting to the four-wheel-drive running mode. When the allowable deceleration is small, since the friction engagement clutch must be engaged with a small engagement torque to slowly increase the rotation speed of the transmission member, the synchronization time until synchronization of the dog clutch becomes longer, and a longer time is required for the shift until the dog clutch is subsequently engaged for shifting to the four-wheel-drive running mode. The engagement torque control of the friction engagement clutch can be provided in various forms such as calculating the engagement torque resulting in the allowable deceleration to provide feedforward control, providing feedback control of the engagement torque such that synchronization progresses at a synchronization speed (change in rotation speed of the transmission member, etc.) resulting in the allowable deceleration, or using both together, for example.

The acceleration/deceleration adaptive synchronization portion controls the engagement torque of the friction engagement clutch depending on the allowable deceleration set based on the vehicle acceleration/deceleration; however, the allowable deceleration may not necessarily be determined based on only the vehicle acceleration/deceleration, and the allowable deceleration may be determined also in consideration of other vehicle states such as the vehicle speed, the accelerator operation amount, the steering angle, and a slip amount of the main drive wheels, for example. The vehicle acceleration/deceleration is at least one of the acceleration and the deceleration of the vehicle and may be applied only at the time of acceleration when the vehicle accelerates, may be applied only at the time of deceleration when the vehicle decelerates, or may be applied at the time of both acceleration and deceleration.

The acceleration/deceleration adaptive synchronization portion is configured to obtain the allowable deceleration from a relationship defined in advance such that the allowable deceleration increases when the vehicle acceleration/deceleration is large as compared to when the vehicle acceleration/deceleration is small, for example, and this relationship may be defined such that the allowable deceleration continuously increases as the vehicle acceleration/deceleration becomes larger or such that the allowable deceleration increases in two stages or three or more multiple stages. The allowable deceleration relative to the vehicle acceleration/deceleration is preliminarily determined by experiments etc. based on a driver's feeling, for example, and the allowable deceleration generally increases when the vehicle acceleration/deceleration is large as compared to when the vehicle acceleration/deceleration is small; however, an acceleration/deceleration region having opposite characteristics may be included.

The four-wheel switching control portion is configured to terminate the engagement torque control of the friction engagement clutch by the acceleration/deceleration adaptive synchronization portion under a predetermined condition at the time of a slip of the main drive wheels, for example; however, if the allowable deceleration is set in consideration of an operating state such as a slip amount and lateral acceleration in addition to the vehicle acceleration/deceleration, for example, if the allowable deceleration is corrected according to a vehicle behavior, the engagement torque control of the friction engagement clutch can be provided by the acceleration/deceleration adaptive synchronization portion regardless of the presence/absence of a slip. The predetermined condition is defined such that, for example, comparing a first synchronization time when the dog clutch is synchronized through the engagement torque control of the friction engagement clutch by the acceleration/deceleration adaptive synchronization portion and a second synchronization time defined in advance according to the operating state such as acceleration/deceleration and a steering angle of a vehicle for stabilizing the vehicle behavior at the time of a slip, the control by the acceleration/deceleration adaptive synchronization portion is terminated if the second synchronization time is shorter than the first synchronization time; however, the control by the acceleration/deceleration adaptive synchronization portion may be terminated without exception if the vehicle behavior is unstable due to a slip, etc., and various other forms are available. Instead of comparing the synchronization times, comparison may be made in terms of synchronization speed such as a change rate (rotation acceleration) of the rotation speed of the transmission member to select a higher synchronization speed.

For example, a four-wheel-drive vehicle has (a) the first transmission shaft and the second transmission shaft (transmission member) arranged parallel with each other along the front-back direction of the vehicle such that a drive gear is relatively rotatably disposed on the first transmission shaft while a driven gear coupled to the drive gear via a chain is relatively non-rotatably disposed on the second transmission shaft, and is configured such that (b) power is transmitted from the first transmission shaft to the second transmission shaft via the first connecting/disconnecting device disposed between the drive gear and the first transmission shaft. Additionally, the vehicle can also be configured such that (a) the power of the drive power source is distributed to the left and right main drive wheels via the differential gear device while (b) a propeller shaft transmitting power to the left and right auxiliary drive wheels serves as a transmission member to (c) transmit the power from the differential case to the propeller shaft via the first connecting/disconnecting device disposed between the differential case of the differential gear device and the propeller shaft. That is, the present invention may be applied to four-wheel-drive vehicles having various other forms of rotationally driving the main drive wheels and the auxiliary drive wheels by a common drive power source.

For the friction engagement clutch, for example, a single plate type or multiplate type clutch engaged by a pressing force from an electric feed screw mechanism, hydraulic pressure, etc. is used, or the clutch may be an electromagnetic coupling etc. using an electromagnetic clutch as a pilot clutch to engage a multiplate type main clutch via a cam. The electric feed screw mechanism is configured to have, for example, (a) an electric motor, (b) a screw mechanism having a rotating screw member that is one of a screw shaft member and a nut member screwed to each other and that is rotationally driven by the electric motor to axially move an axially-moving screw member that is the other of the screw shaft member and the nut member, and (c) a pressing member such as a piston that increases the engagement torque by mechanically pressing the friction engagement clutch as the axially-moving screw member moves in one of the axial directions and that reduces the engagement torque by mechanically decreasing the pressing force against the friction engagement clutch as the axially-moving screw member moves in the opposite direction i.e. the other of the axial directions. The rotating screw member and the axially-moving screw member may be the same screw member (a screw shaft member or a nut member), or may be screw members different from each other, i.e., the rotating screw member may be one of the screw shaft member and the nut member while the axially-moving screw member may be the other of the screw shaft member and the nut member.

Example

An example of the present invention will now be described in detail with reference to the drawings. In the following example, the figures are simplified or deformed as needed and portions are not necessarily precisely drawn in terms of dimension ratio, shape, etc.

FIG. 1 is a skeleton diagram for explaining a general configuration of a drive system of a four-wheel-drive vehicle 8 including a drive mode switching device 10 according to an example of the present invention, also showing a main portion of a control system for various controls in the four-wheel-drive vehicle 8. The four-wheel-drive vehicle 8 includes an engine 12 as a drive power source, left and right front wheels 14L, 14R (referred to as front wheels 14 if not particularly distinguished), left and right rear wheels 16L, 16R (referred to as rear wheels 16 if not particularly distinguished), a power transmission device 18 transmitting power of the engine 12 to each of the front wheels 14 and the rear wheels 16, etc. The rear wheels 16 are main drive wheels serving as drive wheels both during two-wheel-drive (2WD) running mode and four-wheel-drive (4WD) running mode. The front wheels 14 are auxiliary drive wheels serving as driven wheels during 2WD running mode and as drive wheels during 4WD running mode. The four-wheel-drive vehicle 8 of this example is a four-wheel-drive vehicle based on front-engine rear-wheel drive (FR). The engine 12 is an internal combustion engine such as a gasoline engine and a diesel engine. Instead of the engine 12, another drive power source such as an electric motor may be adopted.

The power transmission device 18 includes a transmission 20 coupled to the engine 12, a transfer 22 that is a front/rear wheel power distribution device coupled to the transmission 20, a front propeller shaft 24 and a rear propeller shaft 26 each coupled to the transfer 22, a front-wheel differential gear device 28 coupled to the front propeller shaft 24, a rear-wheel differential gear device 30 coupled to the rear propeller shaft 26, left and right front-wheel axles 32L, 32R (referred to as front-wheel axles 32 if not particularly distinguished) coupled to the front-wheel differential gear device 28, left and right rear-wheel axles 34L, 34R (referred to as rear-wheel axles 34 if not particularly distinguished) coupled to the rear-wheel differential gear device 30, etc. In the power transmission device 18 configured as described above, the power of the engine 12 transmitted to the transfer 22 via the transmission 20 is transmitted from the transfer 22 through a power transmission path on the rear wheel side, that is, through the rear propeller shaft 26, the rear-wheel differential gear device 30, and the rear-wheel axles 34 sequentially to the rear wheels 16. A portion of the power of the engine 12 transmitted toward the rear wheels 16 is distributed by the transfer 22 toward the front wheels 14 and transmitted through a power transmission path on the front wheel side, that is, through the front propeller shaft 24, the front-wheel differential gear device 28, and the front-wheel axles 32 sequentially to the front wheels 14.

The transmission 20 is, for example, a multi-speed automatic transmission of a planetary gear type or a two-shaft meshing type, is capable of establishing a plurality of forward gear speeds for forward running, a backward gear speed for backward running, and a neutral state for interrupting power transmission, and is electrically switched among the gear speeds and the neutral state according to a shift control signal Ssh output from an electronic control device 200 when a shift lever 220 disposed near a driver's seat is operated by the driver. The shift lever 220 can be operated to a D position for selecting the forward running, an R position for selecting the backward running, and an N position for selecting the neutral state. The transmission 20 may be a manual transmission of a two-shaft meshing type etc. that can mechanically be switched to a plurality of forward gear speeds and a reverse gear speed by a driver's manual operation.

A front-side clutch 36 is disposed on the front-wheel axle 32R between the front-wheel differential gear device 28 and the front wheel 14R. The front-side clutch 36 is an electrically controlled dog clutch selectively connecting or disconnecting a power transmission path between the front-wheel differential gear device 28 and the front wheel 14R and includes an actuator 37 such as an electric feed screw mechanism or a hydraulic cylinder moving a sleeve provided with a spline into connected state in which a relative rotation is prohibited or into disconnected state in which a relative rotation is permitted, for example. The front-side clutch 36 is a second connecting/disconnecting device. Although the front-side clutch 36 does not include a synchronization mechanism (synchromesh), a synchronization mechanism such as a synchronizer ring may be included as needed.

Figure 2:
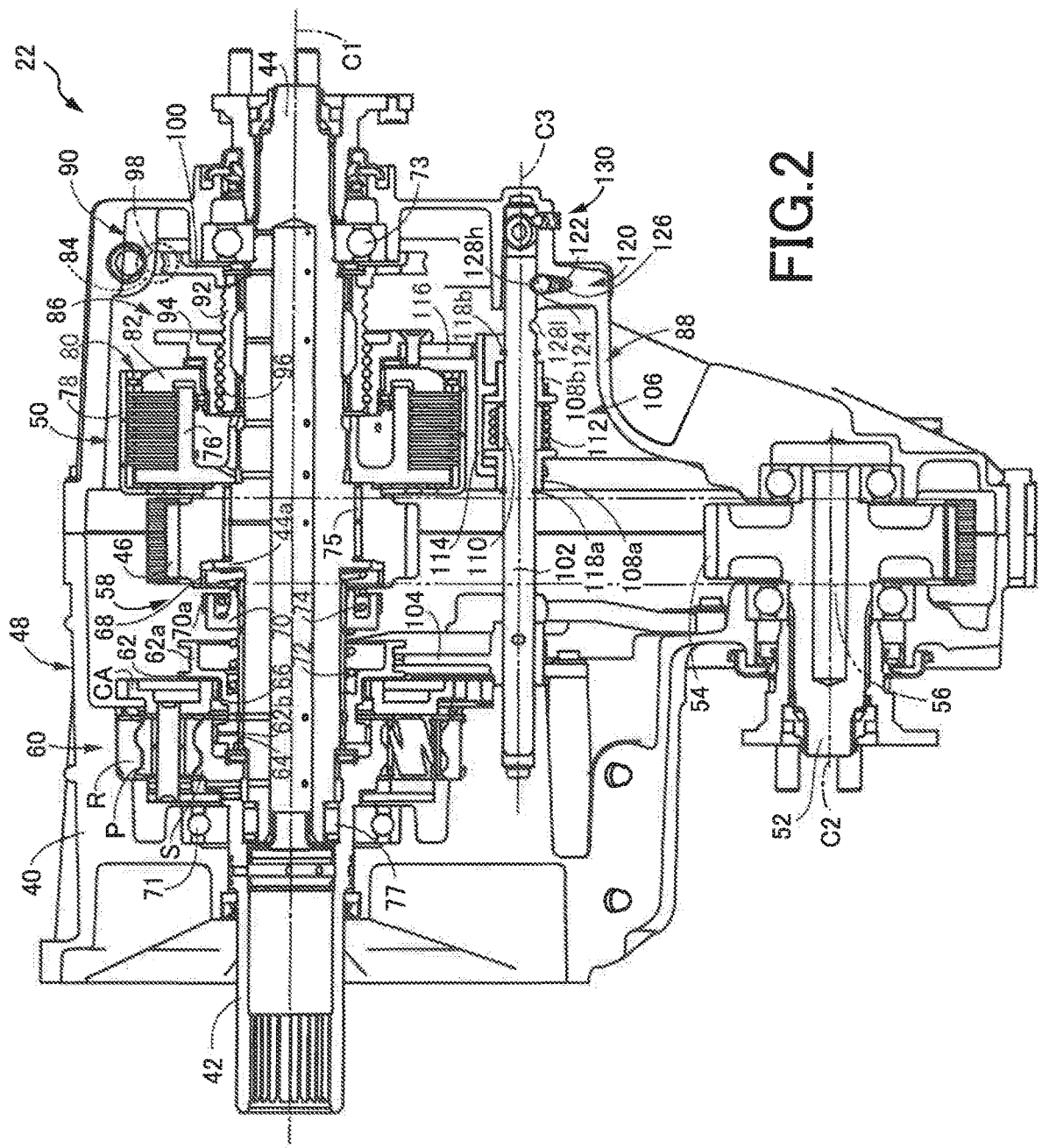
FIG. 2 is a cross-sectional view for specifically explaining a transfer included in the four-wheel-drive vehicle of FIG. 1, showing a state in a high-gear-speed four-wheel-drive (H4) running mode.
Figure 3:
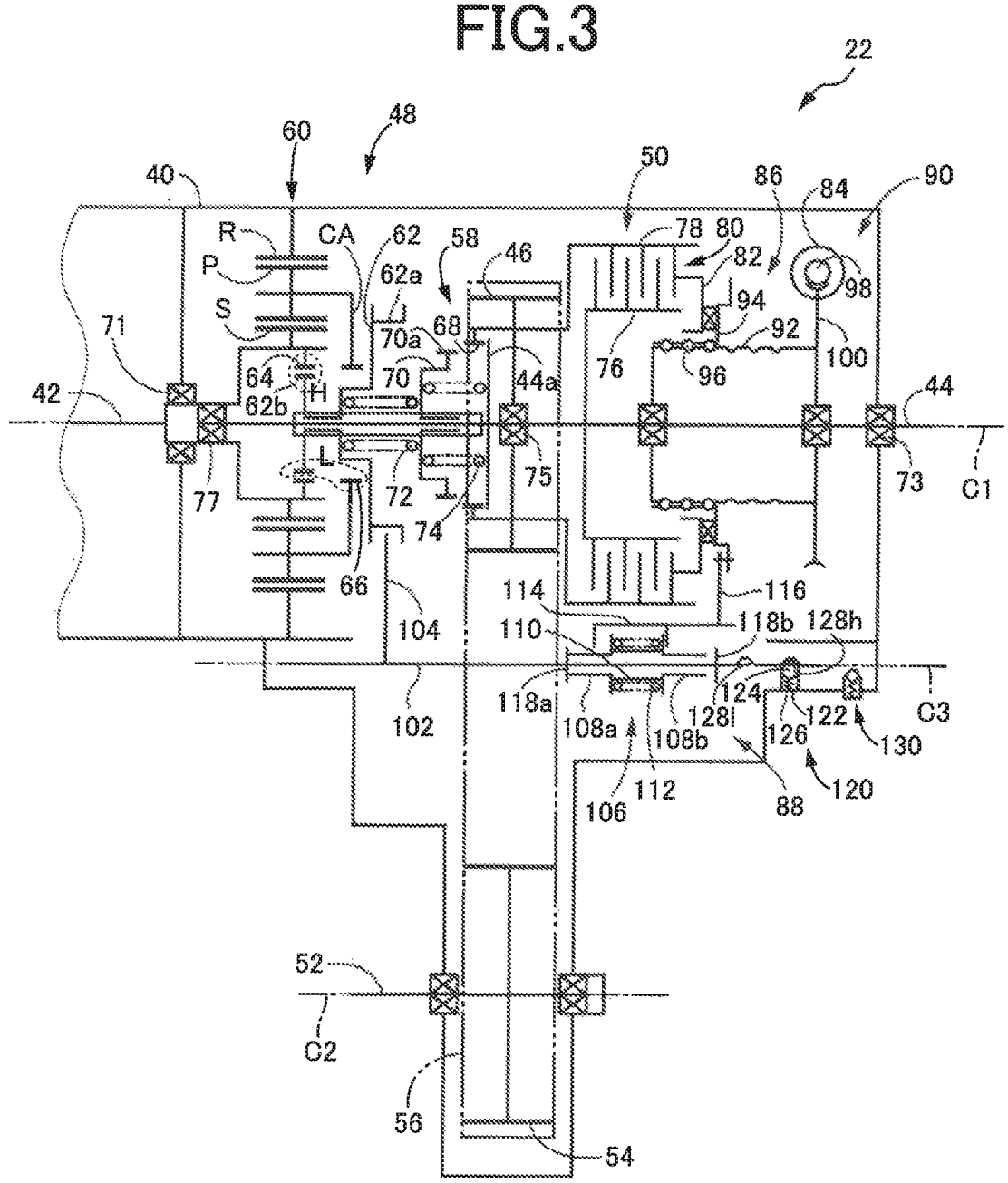
FIG. 3 is a skeleton diagram for explaining a general configuration of the transfer.

FIGS. 2 and 3 are diagrams for explaining a general configuration of the transfer 22, and FIG. 2 is a cross-sectional view of the transfer 22, while FIG. 3 is a skeleton diagram of the transfer 22. The transfer 22 includes a transfer case 40 as a non-rotating member. The transfer 22 includes: an input shaft 42 rotatably supported by the transfer case 40; a rear-wheel-side output shaft 44 outputting power to the rear wheels 16; a sprocket-shaped drive gear 46 outputting power to the front wheels 14, i.e., having a power output destination different from that of the rear-wheel-side output shaft 44; a high-low transmission mechanism 48 serving as an auxiliary transmission changing a speed of rotation of the input shaft 42 before transmission to the rear-wheel-side output shaft 44; and a friction engagement type front-wheel-drive clutch 50 adjusting a transmission torque transmitted from the rear-wheel-side output shaft 44 to the drive gear 46, i.e., transmitting a portion of the power of the rear-wheel-side output shaft 44 to the drive gear 46, on a common first axis (axial center) C1. The input shaft 42 and the rear-wheel-side output shaft 44 are supported concentrically with and relatively rotatably to each other via a first support bearing 71 and a second support bearing (output-shaft support bearing) 73, respectively, by the transfer case 40, and the drive gear 46 is supported relatively rotatably to and concentrically with the rear-wheel-side output shaft 44 via a third support bearing 75. Therefore, the input shaft 42, the rear-wheel-side output shaft 44, and the drive gear 46 are each supported by the transfer case 40 rotatably around the first axis C1. An end portion of the rear-wheel-side output shaft 44 on the front side of the vehicle 8 is rotatably supported by a bearing 77. The input shaft 42 corresponds to an input member and is relatively non-rotatably coupled to an output shaft of the transmission 20 via a joint such as a spline. The rear-wheel-side output shaft 44 corresponds to a first transmission shaft, and the front-wheel-drive clutch 50 is a multiplate friction engagement clutch and corresponds to the first connecting/disconnecting device.

The transfer 22 includes, in the transfer case 40, a front-wheel-side output shaft 52 and a sprocket-shaped driven gear 54 integrally disposed on the front-wheel-side output shaft 52, on a common second axis C2 parallel to the first axis C1. The transfer 22 also includes a front-wheel-drive chain 56 wound over the drive gear 46 and the driven gear 54, and a 4WD lock mechanism 58 as a dog clutch relatively non-rotatably coupling the rear-wheel-side output shaft 44 and the drive gear 46. The front-wheel-side output shaft 52 is relatively non-rotatably coupled to the front propeller shaft 24 via a coupling joint such as a spline and constitutes a second transmission shaft serving as a transmission member together with the front propeller shaft 24.

The high-low transmission mechanism 48 establishes either a high gear speed (a high-speed-side shift position with a small transmission ratio) H or a low gear speed (a low-speed-side shift position with a large transmission ratio) L and changes the speed of rotation transmitted from the transmission 20 to the input shaft 42 before transmission to the rear-wheel-side output shaft 44. The rear-wheel-side output shaft 44 is relatively non-rotatably coupled to the rear propeller shaft 26 via a coupling joint such as a spline. The high-low transmission mechanism 48 includes a single pinion type planetary gear device 60 and a high-low sleeve 62. The planetary gear device 60 has a sun gear S coupled to the input shaft 42 relatively non-rotatably around the first axis C1, a ring gear R disposed concentrically with the sun gear S and coupled to the transfer case 40 relatively non-rotatably around the first axis C1, and a carrier CA supporting a plurality of pinion gears P meshed with the sun gear S and the ring gear R in a rotatable manner around its own axis and a revolvable manner around the sun gear S. Therefore, a rotation speed of the sun gear S is equal to that of the input shaft 42, and a rotation speed of the carrier CA is reduced relative to that of the input shaft 42. High-speed-side gear teeth 64 are disposed on an inner circumferential surface of the sun gear S, and low-speed-side gear teeth 66 having the same diameter as the high-speed-side gear teeth 64 are disposed on the carrier CA. The high-speed-side gear teeth 64 are spline teeth involved in establishment of the high gear speed H for outputting rotation at a speed equal to that of the input shaft 42. The low-speed-side gear teeth 66 are spline teeth involved in establishment of the low gear speed L for outputting rotation at a speed lower than that of the input shaft 42. The high-low sleeve 62 is spline-fitted relatively movably in the first axis C1 direction and relatively non-rotatably to the rear-wheel-side output shaft 44 and includes a fork coupling portion 62a and outer circumferential teeth 62b disposed adjacent to and integrally with the fork coupling portion 62a. By moving the high-low sleeve 62 in a direction parallel to the first axis C1, the outer circumferential teeth 62b are selectively meshed with the high-speed-side gear teeth 64 and the low-speed-side gear teeth 66. When the high-speed-side gear teeth 64 are meshed with the outer circumferential teeth 62b, the rotation equal to the rotation of the input shaft 42 is transmitted to the rear-wheel-side output shaft 44, and when the low-speed-side gear teeth 66 are meshed with the outer circumferential teeth 62b, the rotation reduced relative to the rotation of the input shaft 42 is transmitted to the rear-wheel-side output shaft 44. The high-speed-side gear teeth 64 and the high-low sleeve 62 function as a high-gear-speed clutch forming the high gear speed H, and the low-speed-side gear teeth 66 and the high-low sleeve 62 function as a low-gear-speed clutch forming the low gear speed L.

The transfer 22 adjusts the transmission torque transmitted to the drive gear 46 by the front-wheel-drive clutch 50 to transmit the power transmitted from the high-low transmission mechanism 48 only to the rear wheels 16 or to distribute the power to the front wheels 14 in addition. The transfer 22 is also switched to a 4WD lock state (direct coupling state) in which no rotational difference is generated between the rear propeller shaft 26 and the front propeller shaft 24 by the 4WD lock mechanism 58 or to a 4WD non-lock state (release state) in which the rotational difference therebetween is allowed. Therefore, while the transmission torque through the front-wheel-drive clutch 50 is zero and the 4WD lock mechanism 58 is released, the transfer 22 does not transmit power from the rear-wheel-side output shaft 44 to the front-wheel-side output shaft 52 and, on the other hand, while the torque is transmitted through the front-wheel-drive clutch 50 or the 4WD lock mechanism 58 is directly coupled, the transfer 22 transmits power from the rear-wheel-side output shaft 44 through the drive gear 46, the front-wheel-drive chain 56, and the driven gear 54 to the front-wheel-side output shaft 52.

The 4WD lock mechanism 58 includes lock teeth 68 disposed on an inner circumferential surface of the drive gear 46 and a lock sleeve 70 spline-fitted relatively movably in the first axis C1 direction and relatively non-rotatably to the rear-wheel-side output shaft 44. The lock sleeve 70 is provided with outer circumferential teeth 70a on the outer circumferential surface of the lock sleeve 70 to be meshed with the lock teeth 68 formed on the drive gear 46 when the teeth 70a are moved in the first axis C1 direction, and when the 4WD lock mechanism 58 is in the direct coupling state in which the outer circumferential teeth 70a are meshed with the lock teeth 68, the 4WD lock state is formed such that the rear-wheel-side output shaft 44 and the drive gear 46 are integrally rotated.

The high-low sleeve 62 of the high-low transmission mechanism 48 is disposed in a space on the drive gear 46 side relative to the first support bearing 71 disposed on the input shaft 42 (more specifically, relative to the planetary gear device 60). The lock sleeve 70 is separately disposed adjacent to the high-low sleeve 62 in a space between the high-low transmission mechanism 48 and the drive gear 46. Between the high-low sleeve 62 and the lock sleeve 70, a preloaded first spring 72 is disposed in contact therewith to urge the high-low sleeve 62 and the lock sleeve 70 toward the sides away from each other. Between the drive gear 46 and the lock sleeve 70, a preloaded second spring 74 is disposed in contact with a spring-receiving projecting portion 44a of the rear-wheel-side output shaft 44 and the lock sleeve 70 to urge the lock sleeve 70 toward the front side away from the lock teeth 68. Both the first spring 72 and the second spring 74 are helical compression springs, and the urging force of the first spring 72 is set larger than that of the second spring 74. The spring-receiving projecting portion 44a is a flange portion of the rear-wheel-side output shaft 44 disposed to project toward the outer circumferential side in a space on the radially inside of the drive gear 46. The high-speed-side gear teeth 64 are disposed at a position away from the lock sleeve 70 i.e. a position closer to the front side of the vehicle 8 as compared to the low-speed-side gear teeth 66 in the first axis C1 direction. Therefore, when the high-low sleeve 62 is moved to a high gear position on the front side (the left side in FIGS. 2 and 3) away from the lock sleeve 70, the outer circumferential teeth 62b are meshed with the high-speed-side gear teeth 64 so that the high gear speed H is established, and when the high-low sleeve 62 is moved to a low gear position on the rear side of the vehicle 8 (the right side in FIGS. 2 and 3) i.e., close to the lock sleeve 70, the outer circumferential teeth 62b are meshed with the low-speed-side gear teeth 66 so that the low gear speed L is established. As the high-low sleeve 62 is moved to the low gear position on the rear side, the lock sleeve 70 is moved to a lock position on the rear side due to the urging force of the first spring 72, and the outer circumferential teeth 70a is meshed with the lock teeth 68 so that the 4WD lock mechanism 58 is put into the direct coupling state (4WD lock state). As the high-low sleeve 62 is moved to the high gear position on the front side, the lock sleeve 70 is moved to an unlock position on the front side due to the urging force of the second spring 74, and the meshing between the outer circumferential teeth 70a and the lock teeth 68 is released so that the 4WD lock mechanism 58 is put into the release state.

The front-wheel-drive clutch 50 includes a clutch hub 76 relatively non-rotatably coupled to the rear-wheel-side output shaft 44, a clutch drum 78 relatively non-rotatably coupled to the drive gear 46, a friction engagement element (friction plate) 80 disposed between the clutch hub 76 and the clutch drum 78 to selectively connect and disconnect the clutch hub 78 and the clutch drum 78, and a piston 82 serving as a pressing member pressing the friction engagement element 80. The front-wheel-drive clutch 50 is disposed around the axis C1 of the rear-wheel-side output shaft 44 and on the side opposite to the high-low switching mechanism 48 with respect to the drive gear 46 in the axis C1 direction, and the friction engagement element 80 is pressed by the piston 82 moving toward the drive gear 46. The front-wheel-drive clutch 50 is disposed on the first axis C1 and on the side opposite to the 4WD lock mechanism 58 with respect to the drive gear 46 in the first axis C1 direction, and the friction engagement element 80 is pressed and frictionally engaged by the piston 82 moving toward the drive gear 46 (the front side of the vehicle 8). Therefore, while the piston 82 is moved to the front side of the vehicle 8 (the left side in FIGS. 2 and 3), i.e., the pressing side, and brought into contact with the friction engagement element 80, the front-wheel-drive clutch 50 is put into a torque variable connection state in which the engagement torque (transmission torque capacity) can be adjusted depending on a movement amount of the piston 82, or a complete connection state. On the other hand, while the piston 82 is moved to the rear side of the vehicle 8, i.e., the non-pressing side, away from the drive gear 46, and is not in contact with the friction engagement element 80, the front-wheel-drive clutch 50 is put into a release state (disconnected state).

In the release state of the 4WD lock mechanism 58 in which the front-wheel-drive clutch 50 is in the disconnected state and the outer circumferential teeth 70a of the lock sleeve 70 are not meshed with the lock teeth 68, the power transmission is interrupted between the rear-wheel-side output shaft 44 and the drive gear 46 to establish a 2WD state in which the power transmitted from the transmission 20 is transmitted only to the rear wheels 16. In this 2WD state, when the high-low transmission mechanism 48 is set to the high gear speed H, a high-gear two-wheel (H2) running mode is established. In the H2 running mode, both the front-side clutch 36 and the front-wheel-drive clutch 50 are disconnected, and therefore, the front propeller shaft 24, the front-wheel-side output shaft 52, the drive gear 46, the front-wheel-drive chain 56, the front-wheel differential gear device 28 etc. are stopped rotating, and excellent fuel consumption performance is obtained. When the high-low transmission mechanism 48 is at the high gear speed H and the 4WD lock mechanism 58 is in the release state while the front-wheel-drive clutch 50 is in the torque variable connection state or the complete connection state, a 4WD state at the high gear speed, i.e., a high-gear-speed four-wheel-drive (H4) running mode is established. In this H4 running mode, additionally, when the front-wheel-drive clutch 50 is in the torque variable connection state, a rotational differential between the rear-wheel-side output shaft 44 and the drive gear 46 is allowed so that a differential state (4WD non-lock state) can be achieved, resulting in a high-gear-speed four-wheel-drive automatic (H4A) running mode in which a torque distribution ratio between the front wheels 14 and the rear wheels 16 can continuously be changed in a range of about 0:100 to 50:50, for example, by controlling the engagement torque of the front-wheel-drive clutch 50. When the front-wheel-drive clutch 50 is in the complete connection state, the rear-wheel-side output shaft 44 and the drive gear 46 are integrally rotated in the 4WD lock state, resulting in the high-gear-speed four-wheel-drive lock (H4L) running mode. On the other hand, when the high-low transmission mechanism 48 is at the low gear speed L and the front-wheel-drive clutch 50 is in the disconnected state while the 4WD lock mechanism 58 is in the direct coupling state (4WD lock state), the low-gear four-wheel lock (L4L) running mode is established. This L4L running mode is suitably selected in the case of low-speed off-road running with a large torque on riverbeds, rocky areas, steep slopes, etc.

For operating the high-low transmission mechanism 48, the front-wheel-drive clutch 50, and the 4WD lock mechanism 58 to switch the running mode, the transfer 22 further includes an electric motor 84, a screw mechanism 86 converting a rotational motion of the electric motor 84 into a linear motion, and a transmission mechanism 88 transmitting the linear motion of the screw mechanism 86 to the high-low switching mechanism 48 and the 4WD lock mechanism 58.

The screw mechanism 86 is disposed concentrically with the first axis C1 and on the side opposite to the drive gear 46 with respect to the front-wheel-drive clutch 50, and includes a screw shaft member 92 and a nut member 94 screwed to each other. The screw shaft member 92 is disposed in the transfer case 40 immovably in the first axis C1 direction and rotatably around the first axis C1 and is rotationally driven by the electric motor 84 via a worm gear 90 functioning as a speed reduction mechanism. The worm gear 90 is a gear pair including a worm 98 integrally coupled to a motor shaft of the electric motor 84 and a worm wheel 100 integrally fixed to the screw shaft member 92, and the rotation of the electric motor 84 is reduced in speed and transmitted to the screw shaft member 92 via the worm gear 90. The nut member 94 is disposed movably in the first axis C1 direction and non-rotatably around the first axis C1 and screwed to the screw shaft member 92 via a plurality of balls 96. In the screw mechanism 86 configured as described above, the screw shaft member 92 is rotationally driven by the electric motor 84, and the nut member 94 is thereby linearly moved in the first axis C1 direction. Therefore, the screw shaft member 92 functions as a rotating screw member rotationally driven by the electric motor 84, and the nut member 94 functions as an axially-moving screw member moved in the axial direction. The screw mechanism 86 converts the rotation of the electric motor 84 transmitted to the screw shaft member 92 into the linear motion of the nut member 94.

Figure 5:
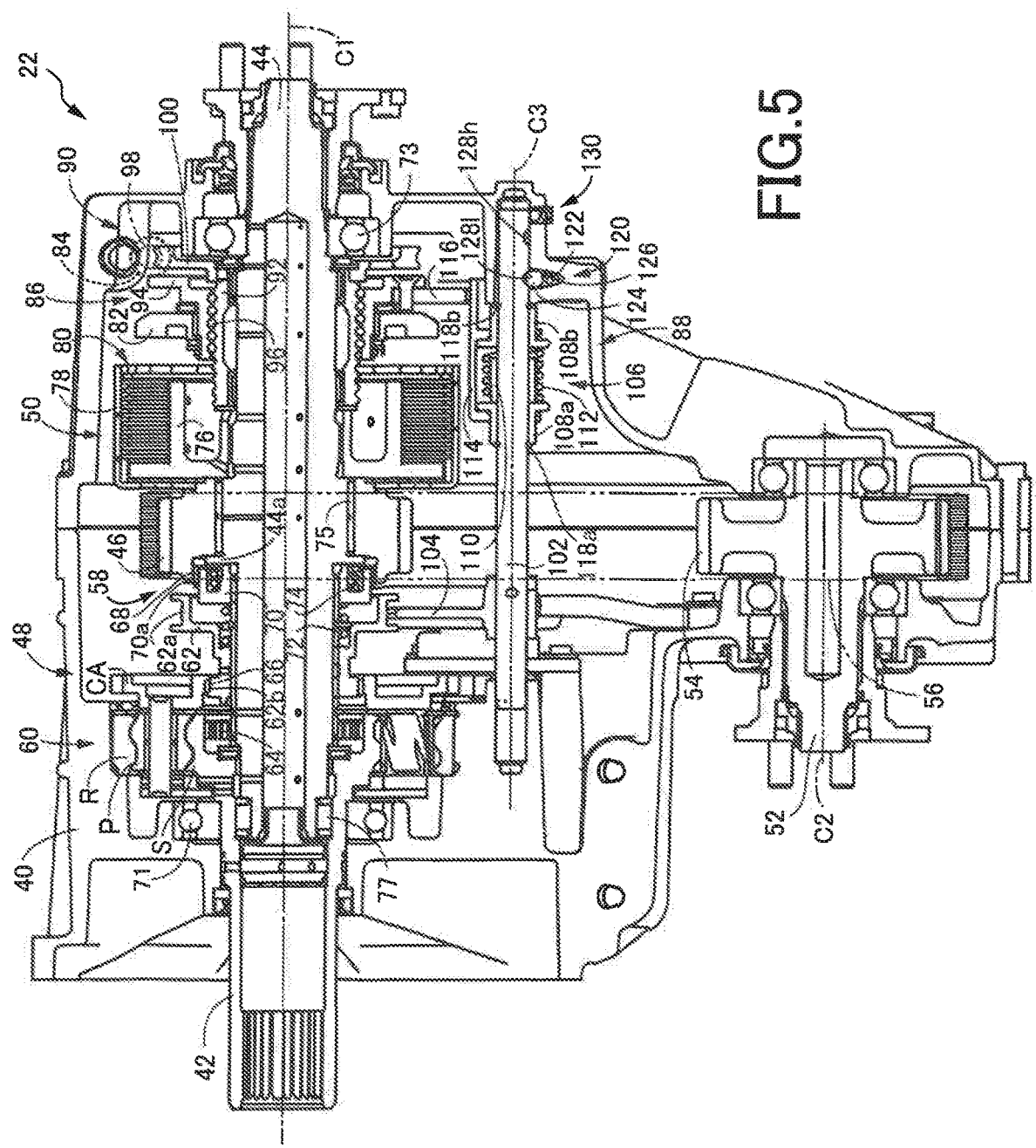
FIG. 5 is a cross-sectional view for explaining a state in which the transfer is put into a low-gear four-wheel lock (L4L) running mode.

The piston 82 of the front-wheel-drive clutch 50 is coupled relatively immovably in a direction parallel to the first axis C1 and relatively rotatably around the first axis C1 with respect to the nut member 94 of the screw mechanism 86. As a result, the linear motion of the nut member 94 in the screw mechanism 86 is transmitted to the friction engagement element 80 of the front-wheel-drive clutch 50, and the front-wheel-drive clutch 50 is switched to any one of the disconnected state, the torque variable connection state, and the complete connection state depending on the axial position of the nut member 94. Specifically, while the nut member 94 is located on the rear side of the vehicle 8 in the first axis C1 direction as shown in FIG. 5, the piston 82 is away from the friction engagement element 80 so that the front-wheel-drive clutch 50 is in the disconnected state, and when the nut member 94 is moved to the front side of the vehicle 8, the piston 82 is brought into contact with the friction engagement element 80 so that the front-wheel-drive clutch 50 is put into the torque variable connection state. In this torque variable connection state, the piston 82 is pressed against the friction engagement element 80 of the front-wheel-drive clutch 50 depending on a linear motion force of the nut member 94, i.e., a motor torque of the electric motor 84, and the engagement torque of the front-wheel-drive clutch 50 is adjusted. When the nut member 94 is further moved to the front side, the front-wheel-drive clutch 50 is put into the complete connection state as shown in FIG. 2.

The transmission mechanism 88 includes a fork shaft 102 disposed around a third axis C3 different from and parallel to the first axis C1 and coupled to the nut member 94 and a fork 104 fixed to the fork shaft 102 and coupled to the high-low sleeve 62. The transmission mechanism 88 transmits the linear motion force of the nut member 94 in the screw mechanism 86 via the fork shaft 102 and the fork 104 to the high-low sleeve 62 of the high-low switching mechanism 48. A force is mutually applied to the high-low sleeve 62 and the lock sleeve 70 via the first spring 72, and a force is applied to the lock sleeve 70 via the second spring 74 from the spring-receiving projecting portion 44*a* of the rear-wheel-side output shaft 44. Therefore, the transmission mechanism 88 transmits the linear motion force of the nut member 94 in the screw mechanism 86 to the lock sleeve 70 of the 4WD lock mechanism 58 via the high-low sleeve 62.

The fork shaft 102 is disposed in the transfer case 40 parallel with the rear-wheel-side output shaft 44 and movably in the third axis C3 direction that is the axial direction of the fork shaft 102. The fork shaft 102 is coupled to the nut member 94 via a waiting mechanism 106 and is mechanically linearly reciprocated in the third axis C3 direction according to a linear reciprocating movement of the nut member 94. The waiting mechanism 106 includes: a pair of flanged cylindrical members 108*a*, 108*b* disposed on the third axis C3 slidably with respect to the fork shaft 102 in a direction parallel to the third axis C3 and having one end portions provided with flanges facing each other, a cylindrical spacer 110 interposed between the paired flanged cylindrical members 108*a*, 108*b*; a spring member (helical compression spring) 112 disposed in a preloaded state on the outer circumferential side of the spacer 110; a holding member 114 holding the pair of flanged cylindrical members 108*a*, 108*b* slidably in a direction parallel to the third axis C3; and a coupling member 116 integrally coupling the holding member 114 and the nut member 94. The holding member 114 comes into contact with the flanges of the flanged cylindrical members 108*a*, 108*b* to slide the flanged cylindrical members 108*a*, 108*b* on the fork shaft 102. While the flanges of the flanged cylindrical members 108*a*, 108*b* are both in contact with the holding member 114, the length between the flanges is made longer than the length of the spacer 110. Therefore, the state of the flanges both being in contact with the holding member 114 is formed by the urging force of the spring member 112. The waiting mechanism 106 includes stoppers 118*a*, 118*b* disposed on the fork shaft 102 to limit the move of each of the flanged cylindrical members 108*a*, 108*b* to an adverse direction along the third axis C3 direction each other. Since the move of the flanged cylindrical members 108*a*, 108*b* is limited by the stoppers 118*a*, 118*b*, the linear motion force of the nut member 94 can be transmitted to the fork shaft 102 via the holding member 114.

The fork shaft 102 is integrally provided with the shift fork 104. The shift fork 104 is coupled to the fork coupling portion 62*a* disposed in the high-low sleeve 62, and when the high-low sleeve 62 is mechanically linearly reciprocated in the first axis C1 direction due to the linear reciprocation of the fork shaft 102, the gear speed of the high-low transmission mechanism 48 is switched. Specifically, for example, when the fork shaft 102 is moved to the rear side of the vehicle 8 from a state in which the high gear speed H is established with the outer circumferential teeth 62*b* of the high-low sleeve 62 meshed with the high-speed-side gear teeth 64 as shown in FIG. 2, the high-low sleeve 62 is moved toward the drive gear 46, and the outer circumferential teeth 62*b* are meshed with the low-speed-side gear teeth 66 so that the low gear speed L is established. When the fork shaft 102 is moved in a direction opposite to an arrow F2 direction, i.e., to the front side of the vehicle 8 from the state in which the low gear speed L is established as shown in FIG. 5, the high-low sleeve 62 is moved to the side away from the drive gear 46, and the outer circumferential teeth 62*b* are meshed with the high-speed-side gear teeth 64 so that the high gear speed H is established.

The transmission mechanism 88 is configured to include the first spring 72 and the second spring 74 and mechanically switches the operation state of the 4WD lock mechanism 58 in conjunction with switching of the gear speed of the high-low transmission mechanism 48. Specifically, while the high-low transmission mechanism 48 is set to the high gear speed H as shown in FIG. 2, the 4WD lock mechanism 58 is in the release state, and when the high-low sleeve 62 is moved toward the drive gear 46 for switching to the low gear speed L, the lock sleeve 70 is moved to the lock position on the rear side of the vehicle 8 according to the urging force of the first spring 72, and the outer circumferential teeth 70*a* are meshed with the lock teeth 68 so that the 4WD lock mechanism 58 is put into the direct coupling state (4WD lock state). While the high-low transmission mechanism 48 is set to the low gear speed H as shown in FIG. 5, the 4WD lock mechanism 58 is in the direct coupling state, and when the high-low sleeve 62 is moved to the front side of the vehicle 8 away from the drive gear 46 for switching to the high gear speed H, the lock sleeve 70 is moved to the front side of the vehicle 8 according to the urging force of the second spring 74, and the meshing between the outer circumferential teeth 70*a* and the lock teeth 68 is released so that the 4WD lock mechanism 58 is put into the release state. The fork shaft 102 is moved in the third axis C3 direction between the high gear position at which the high-low transmission mechanism 48 is at the high gear speed H while the 4WD lock mechanism 58 is in the release state and the low gear position at which the high-low transmission mechanism 48 is at the low gear speed L while the 4WD lock mechanism 58 is in the 4WD lock state.

Figure 4:
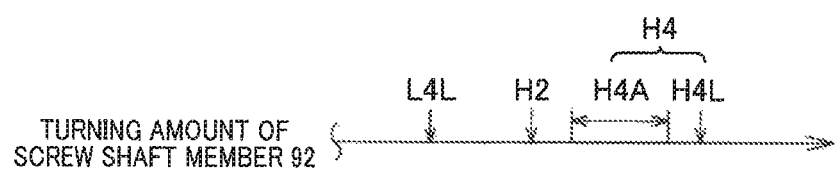
FIG. 4 is a diagram of an example of relationship between a turning amount of a nut member of a screw mechanism disposed in the transfer and a running mode.

When the screw shaft member 92 is rotated by the electric motor 84 in one direction (rotation direction in which the nut member 94 is moved to the front side of the vehicle 8) and the fork shaft 102 is moved from the low gear position to the high gear position, the piston 82 is moved to the front side of the vehicle 8 by the axial movement of the nut member 94 due to the rotation of the screw shaft member 92; however, at both the low gear position and the high gear position, the friction engagement element 80 of the front-wheel-drive clutch 50 is retained in the disconnected state in which the pressing by the piston 82 is released. Therefore, when the fork shaft 102 is moved to the low gear position, the L4L running mode is established, and when the fork shaft 102 is moved to the high gear position, the H2 running mode is established. FIG. 4 is a diagram of a relationship between an amount of turning of the screw shaft member 92 in one direction, i.e., an amount of movement of the nut member 94 to the front side of the vehicle 8, and the running mode. FIG. 5 shows a state in which the L4L running mode is established.

On the other hand, when the screw shaft member 92 is further rotated in one direction by the electric motor 84 from the state in which the fork shaft 102 is set to the high gear position, the piston 82 is brought into contact with the friction engagement element 80 due to the movement of the nut member 94 to the front side of the vehicle 8, and the front-wheel-drive clutch 50 is put into the connection state in which power is transmitted toward the front wheels 14, so that the H4 running mode is established. This H4 running mode is established as the H4A running mode in which the front-wheel-drive clutch 50 is in the torque variable connection state, i.e., in which the rotational difference is allowed, and the H4L running mode in which the front-wheel-drive clutch 50 is completely connected, depending on the axial position of the nut member 94.

Specifically, as shown in FIG. 4, the L4L running mode, H2 running mode, H4A running mode, and H4L running mode are switched in this order and reverse order depending on a turning position of the screw shaft member 92. In other words, by turning the screw shaft member 92 by the electric motor 84 to turning positions L4L, H2, H4A, and H4L shown in FIG. 4, the L4L running mode, the H2 running mode, the H4A running mode, and the H4L running mode are respectively established. The H4L position and the H4A position may be determined through control of the motor torque of the electric motor 84 corresponding to the engagement torque of the front-wheel-drive clutch 50. The waiting mechanism 106 is configured to allow the axial movement of the nut member 94, i.e., the relative movement with respect to the fork shaft 102, at the time of switching between the H4L running mode, the H4A running mode, and the H2 running mode.

The transfer 22 includes a shaft positioning mechanism 120 positioning the fork shaft 102 at the high gear position or the low gear position. The shaft positioning mechanism 120 includes a housing hole 122 formed in an inner circumferential surface of the transfer case 40 on which the fork shaft 102 slides, a lock ball 124 housed in the housing hole 122, a locking spring 126 housed in the housing hole 122 and urging the lock ball 124 toward the fork shaft 102, and a pair of recesses 128*h* and 128*l* formed on an outer circumferential surface of the fork shaft 102. The fork shaft 102 is positioned at the high gear position by engaging the lock ball 124 with the recess 128*h*, and the fork shaft 102 is positioned at the low gear position by engaging the lock ball 124 with the recess 128*l*. Even when the output from the electric motor 84 is stopped while the fork shaft 102 is at each of the gear positions, the gear position of the fork shaft 102 is retained by the shaft positioning mechanism 120.

The transfer 22 includes a low gear position detection switch 130 detecting whether the fork shaft 102 is at the low gear position. The low gear position detection switch 130 is a ball type contact switch, for example, and is brought into contact with the fork shaft 102 moved to the low gear position to detect that the shaft 102 is moved to the low gear position. When the low gear position detection switch 130 detects that the shaft 102 is at the low gear position, for example, an indicator for notifying the driver of the L4L running mode is turned on. This indicator is disposed on a display device 230 arranged in an instrument panel, for example.

Returning to FIG. 1, the four-wheel-drive vehicle 8 includes the electronic control device 200 as a controller switching the running mode, controlling the output of the engine 12, and switching the gear speed of the transmission 20. The electronic control device 200 is configured to include a so-called microcomputer including a CPU, a RAM, a ROM, an I/O interface, etc., and the CPU executes a signal process according to a program stored in advance in the ROM while utilizing a temporary storage function of the RAM to provide the various controls. The device 200 is configured separately for a running mode switching control, an output control of the engine 12, a shift control of the transmission 20, etc., as necessary. The electronic control device 200 is supplied with a signal from the low gear position detection switch 130 indicating that the fork shaft 102 is at the low gear position and is also supplied with various pieces of information necessary for control, from an engine rotation speed sensor 202, a motor rotation angle sensor 204, wheel speed sensors 206, a throttle opening degree sensor 208, a high-low changeover switch 210 operated by the driver for switching between the high gear speed H and the low gear speed L, a 4WD selection switch 212 operated by the driver for selecting the 4WD state, a 4WD lock selection switch 214 operated by the driver for selecting the 4WD lock state, a vehicle longitudinal acceleration sensor 216, a clutch rotation speed sensor 218, a shift position sensor 222 detecting an operation position Psh of the shift lever 220 operated by the driver, etc., such as an engine rotation speed Ne, a rotation angle (motor rotation angle) θm of the electric motor 84 of the transfer 22, wheel speeds Nwfl, Nwfr, Nwrl, Nwrr of the front wheels 14L, 14R and the rear wheels 16L, 16R, a throttle opening degree θth, a gear speed Shl selected by the high-low changeover switch 210, a 4WD request 4WDon that is a signal indicating that the 4WD selection switch 212 is operated, a 4LOCKon that is a signal indicating that the 4WD lock selection switch 214 is operated, an acceleration/deceleration G of the vehicle 8, a rotation speed (clutch rotation speed) Nc of the clutch drum 78 corresponding to a rotation speed of the front propeller shaft 24, and the operation position Psh of the shift lever 220. A vehicle speed V is obtained from the wheel speeds Nwfl, Nwfr, Nwrl, Nwrr.

As shown in FIG. 1, for example, the electronic control device 200 outputs an engine output control command signal Se for the output control of the engine 12, a clutch meshing command signal Sd for meshing engagement of the front-side clutch 36, the shift control signal Ssh for switching the gear speed of the transmission 20, and a motor drive command signal Sm for controlling the turning amount of the electric motor 84 for switching the running mode, to the engine 12, the actuator 37 of the front-side clutch 36, the transmission 20, and the electric motor 84, respectively. The electronic control device 200 also outputs a display signal Si for controlling the display device 230 arranged in the instrument panel, etc., to display the L4L running mode as well as other pieces of information. The display device 230 includes not only a visual display but also a sound-generating device generating a buzzer sound etc.

The electronic control device 200 functionally includes a four-wheel switching control portion 240 in relation to the switching control of the running mode. The four-wheel switching control portion 240 provides a connect control of connecting both the front-side clutch 36 and the front-wheel-drive clutch 50 for 2-to-4 switching, i.e., switching to the H4 running mode during running in the H2 running mode in which both the front-side clutch 36 and the front-wheel-drive clutch 50 are disconnected. This four-wheel switching control portion 240 functionally includes an acceleration/deceleration adaptive synchronization portion 242 and a behavior stabilization priority synchronization portion 244 and executes a signal process according to steps S1 to S12 (hereinafter simply referred to as S1 to S12) of FIG. 6. S2 to S6 and S9 correspond to a function of the acceleration/deceleration adaptive synchronization portion 242, and S6 to S8 and S10 correspond to a function of the behavior stabilization priority synchronization portion 244. S6 serves both as the functions of the acceleration/deceleration adaptive synchronization portion 242 and the behavior stabilization priority synchronization portion 244 and functions as a first synchronization time calculating portion. S7 functions as a second synchronization time setting portion. The drive mode switching device 10 is configured to include the four-wheel switching control portion 240 and the front-side clutch 36 and the front-wheel-drive clutch 50. The H2 running mode corresponds to the two-wheel-drive running mode (2WD running), and the H4 running mode corresponds to the four-wheel-drive running mode (4WD running).

Figure 6:
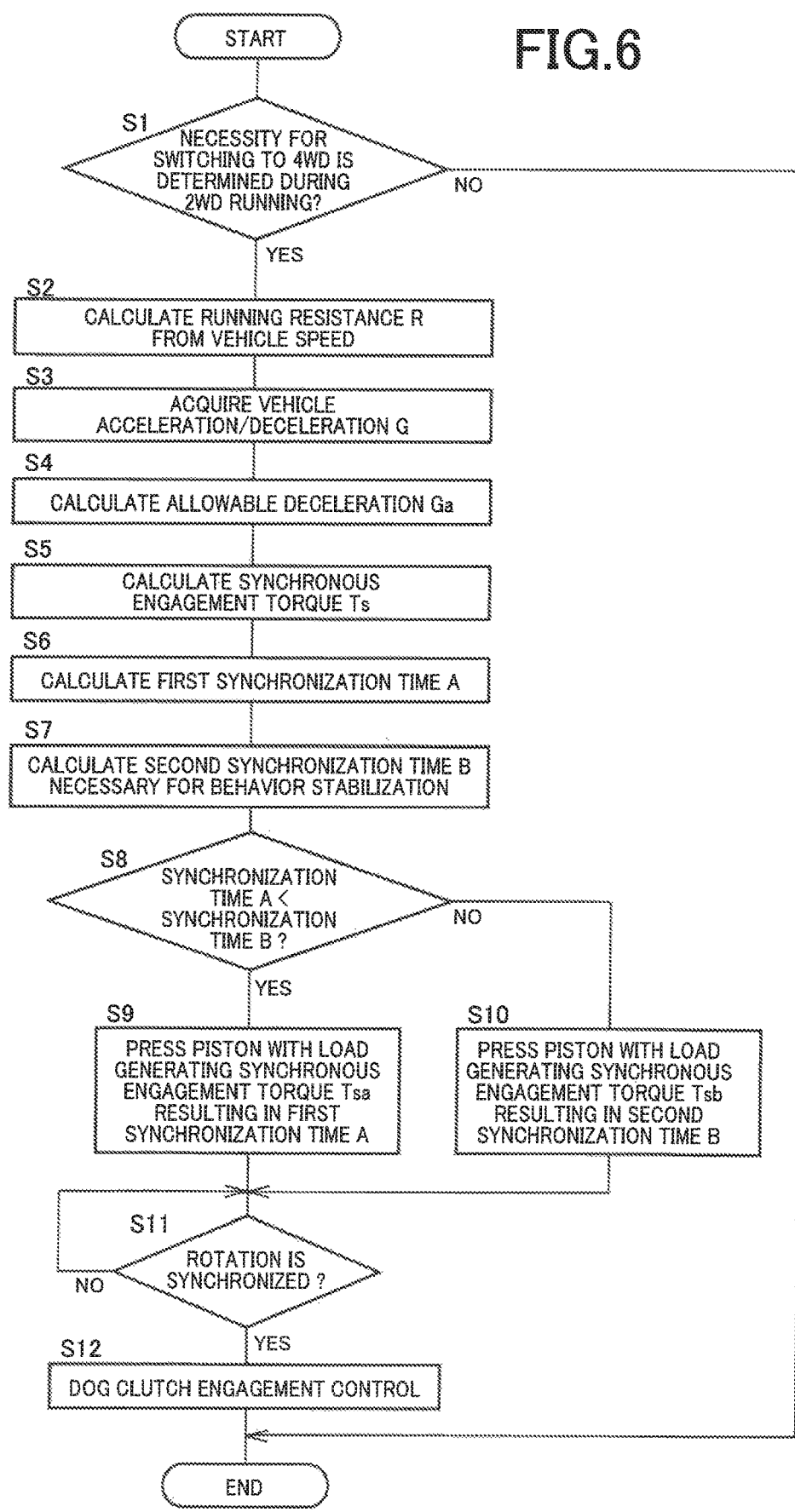
FIG. 6 is a flowchart for specifically explaining an operation of a four-wheel switching control portion functionally included by an electronic control device of FIG. 1.

At S1 of FIG. 6, it is determined whether a necessity for switching to the H4 running mode (4WD running) is determined automatically due to a slip occurrence of the rear wheels 16L, 16R that are the main drive wheels, the driving status, etc., or according to a selection operation of the 4WD selection switch 212, during running in the H2 running mode (2WD running). If the necessity for switching to the H4 running mode (4WD running) is not determined, the process is simply terminated, or if the necessity for switching to the H4 running mode (4WD running) is determined, S2 and subsequent steps are executed. At S2, a running resistance R attributable to air resistance, road gradient, etc. is calculated according to a map, an arithmetic expression, etc. predefined by using the vehicle speed V etc. as variables. At S3, a vehicle acceleration/deceleration G corresponding to the acceleration and deceleration of the vehicle 8 is read from the vehicle longitudinal acceleration sensor 216.

Figure 7:
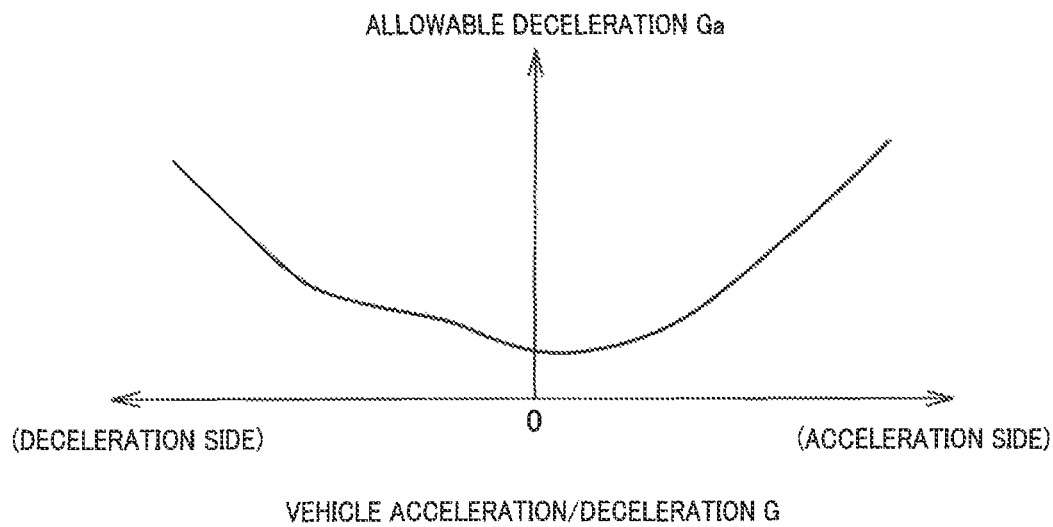
FIG. 7 is a diagram of an example of a data map when an allowable deceleration Ga is calculated at step S4 of FIG. 6.

At S4, an allowable deceleration Ga at the time of the 2-to-4 switching is calculated from a map, an arithmetic expression, etc. predefined by using the vehicle acceleration/deceleration G as a variable. FIG. 7 is an example of the map of the allowable deceleration Ga, which is determined in advance by experiments. Specifically, when the H2 running mode is switched to the H4 running mode, the rotation speeds of the front propeller shaft 24, the front-wheel-side output shaft 52, the drive gear 46, the front-wheel-drive chain 56, the front-wheel differential gear device 28, etc. that are stopped are increased based on the engagement torque of the front-wheel-drive clutch 50 that is the friction engagement clutch, and after the synchronization in which a differential rotation of the front-side clutch 36, i.e., the dog clutch, becomes equal to or less than a predetermined value, the front-side clutch 36 must be meshed and engaged. In this case, at the time of synchronous control of increasing the rotation speed of the front propeller shaft 24 etc., a portion of the power transmitted from the engine 12 to the rear-wheel-side output shaft 44 is consumed via the front-wheel-drive clutch 50 by a rotational load due to inertia of the front propeller shaft 24 etc., and the power transmitted toward the rear wheels 16L, 16R is accordingly temporarily reduced, so that an acceleration is reduced and a deceleration shock occurs. Even during deceleration of the vehicle 8, the rotational load due to inertia of the front propeller shaft 24 etc. acts as a braking force on the rear wheels 16L, 16R, resulting in a deceleration shock associated with a temporary increase in deceleration.

When the present inventors examined the deceleration shock described above based on whether a driver or an occupant perceives the shock in relationship with the vehicle acceleration/deceleration G, it was found that, in a region of small vehicle acceleration/deceleration G, the driver easily perceives even a slight deceleration shock of a small variation width of the acceleration/deceleration, and that in a region of large vehicle acceleration/deceleration G (region in which the acceleration or deceleration is large), the driver tends to hardly perceive the deceleration shock unless the shock is relatively large and has a large variation width of the acceleration/deceleration. The map of FIG. 7 is prepared based on such knowledge, and the allowable deceleration Ga corresponds to an upper limit value of deceleration at which a driver or an occupant hardly perceives a deceleration shock. Therefore, in the region of small vehicle acceleration/deceleration G (a constant speed running region in which the vehicle acceleration/deceleration G is a predetermined value or less), the allowable deceleration Ga is small, and deceleration shock can be suppressed by slowly increasing the rotation speed of the front propeller shaft 24 etc. such that the deceleration of the vehicle 8 becomes small. In the region of large vehicle acceleration/deceleration G (a sudden acceleration region in which the vehicle acceleration/deceleration G is a predetermined value or more, a sudden deceleration region in which the vehicle acceleration/deceleration G is a predetermined value or less), the allowable deceleration Ga is large, and since the driver hardly perceives the shock even if the deceleration of the vehicle 8 is large, the rotation speed of the front propeller shaft 24 etc. can quickly be increased to shorten the synchronization time and the time required for shifting to the H4 running mode. The map of FIG. 7 is set based on data at the time of straight running when the steering angle is substantially zero; however, for example, a plurality of maps can be defined for respective sections of the steering angle, and the map can also be set in consideration of other operating states.

At S5, a synchronous engagement torque Ts is calculated at which the deceleration of the vehicle 8 is the allowable deceleration Ga at the time of synchronous control of increasing the rotation speed of the front propeller shaft 24 etc. through the engagement control of the front-wheel-drive clutch 50. The synchronous engagement torque Ts is the engagement torque of the front-wheel-drive clutch 50 and is calculated from a map etc. predefined by using the allowable deceleration Ga and the running resistance R as variables. At S6, a first synchronization time A is calculated as a synchronization time when the rotation speed of the front propeller shaft 24 etc. is increased by engaging the front-wheel-drive clutch 50 with the synchronous engagement torque Ts, from a map etc. predefined by using the synchronous engagement torque Ts and the vehicle speed V as variables. The synchronization time is the time required from the start of the engagement control of the front-wheel-drive clutch 50 to the synchronization, and another rotation speed corresponding to the vehicle speed V such as a rotation speed of the rear-wheel-side output shaft 44 can also be used instead of the vehicle speed V.

Figure 8:
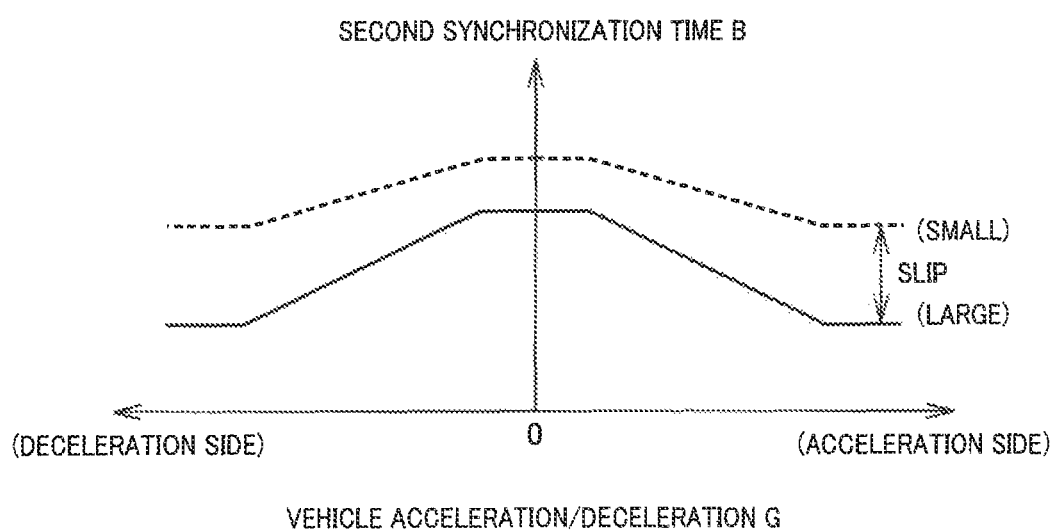
FIG. 8 is a diagram of an example of a data map when a second synchronization time B is calculated at step S7 of FIG. 6.

At S7, a second synchronization time B is calculated that is necessary for suppressing a disturbance of behavior of the vehicle 8 due to a slip of the rear wheels 16L, 16R serving as the main drive wheels. The second synchronization time B is calculated according to the presence/absence of the slip of the rear wheels 16L, 16R or a degree of the slip, from a map etc. predefined by using the vehicle acceleration/deceleration G as a variable as shown in FIG. 8, for example. The map of FIG. 8 is defined such that the second synchronization time B becomes shorter for prompt shifting to the H4 running mode when the vehicle acceleration/deceleration G is large as compared to when the vehicle acceleration/deceleration G is small. The magnitude of the slip is, for example, the magnitude of difference between the vehicle speed V and the wheel speeds Nwrl, Nwrr of the rear wheels 16L, 16R. The second synchronization time B can be determined in consideration of other vehicle states such as acceleration in the lateral direction of the vehicle.

At S8, the first synchronization time A and the second synchronization time B are compared, and when A<B is satisfied, the synchronous control is provided based on the first synchronization time A at S9, or when A≥B is satisfied, the synchronous control is provided based on the second synchronization time B at S10. The synchronous control of S9 includes calculating a first synchronous engagement torque Tsa at which synchronization can be achieved within the first synchronization time A and outputting the motor drive command signal Sm for controlling the motor torque of the electric motor 84 such that the piston 82 is pressed with a load causing engagement of the front-wheel-drive clutch 50 at the first synchronous engagement torque Tsa. As a result, the rotation speed of the front propeller shaft 24 etc. is increased such that the deceleration of the vehicle 8 at the time of the synchronous control becomes equal to the allowable deceleration Ga and that synchronization can be achieved within the first synchronization time A. The synchronous control of S10 includes calculating a second synchronous engagement torque Tsb at which synchronization can be achieved within the second synchronization time B and outputting the motor drive command signal Sm for controlling the motor torque of the electric motor 84 such that the piston 82 is pressed with a load causing engagement of the front-wheel-drive clutch 50 at the second synchronous engagement torque Tsb. As a result, the rotation speed of the front propeller shaft 24 etc. is increased such that synchronization is achieved within the second synchronization time B necessary for stabilization of behavior of the vehicle 8. The synchronous engagement torques Tsa, Tsb are calculated by using a common map or an arithmetic expression predefined by using the synchronization time as a variable. The motor torque (the motor drive command signal Sm) generating the piston pressing load for engaging the front-wheel-drive clutch 50 at these synchronous engagement torques Tsa, Tsb is obtained from a common map or arithmetic expression predefined by using the engagement torque as a variable. Since the first synchronous engagement torque Tsa is the same as the synchronous engagement torque Ts calculated at S5, the synchronous engagement torque Ts calculated at S5 can also be used.

S9 and S10 can also be executed by setting synchronization speeds, i.e., change rate of the clutch rotation speed Nc, etc., at which synchronization can be achieved within the synchronization times A, B, and providing feedback control of the engagement torque of the front-wheel-drive clutch 50, i.e., the motor torque of the electric motor 84, such that the synchronization progresses at the synchronization speeds. At S6 and S7, instead of calculating the synchronization times A, B, the synchronization speeds may be calculated, and the higher synchronization speed may be selected to provide the engagement torque control of the front-wheel-drive clutch 50 such that the synchronization progresses at the synchronization speed.

At S11, it is determined whether a rotation synchronization state is achieved such that the differential rotation of the front-side clutch 36 is substantially zero. Specifically, this can be determined based on whether the clutch rotation speed Nc (the rotation speed on the synchronized side), i.e., the rotation speed of the clutch drum 78 of the front-wheel-drive clutch 50 rotated integrally with the drive gear 46, is substantially identical to a synchronous rotation speed determined by an average value of the wheel speeds Nwfl, Nwfr of the front wheels 14L, 14R and a reduction ratio of a front-wheel-side power transmission path (e.g., the reduction ratio of the front-wheel differential gear device 28). The synchronous rotation speed can also be obtained from the wheel speeds Nwrl, Nwrr of the rear wheels 16L, 16R, the reduction ratio of the rear-wheel differential gear device 30, etc. If it is determined that the rotation synchronization state is achieved and the determination of S11 becomes YES (affirmative), S12 is executed to output the clutch meshing command signal Sd to mesh and engage the front-side clutch 36. As a result, the H4 running mode is established, and the four-wheel-drive running mode is achieved such that both the front wheels 14L, 14R and the rear wheels 16L, 16R are rotationally driven.

Figure 9:
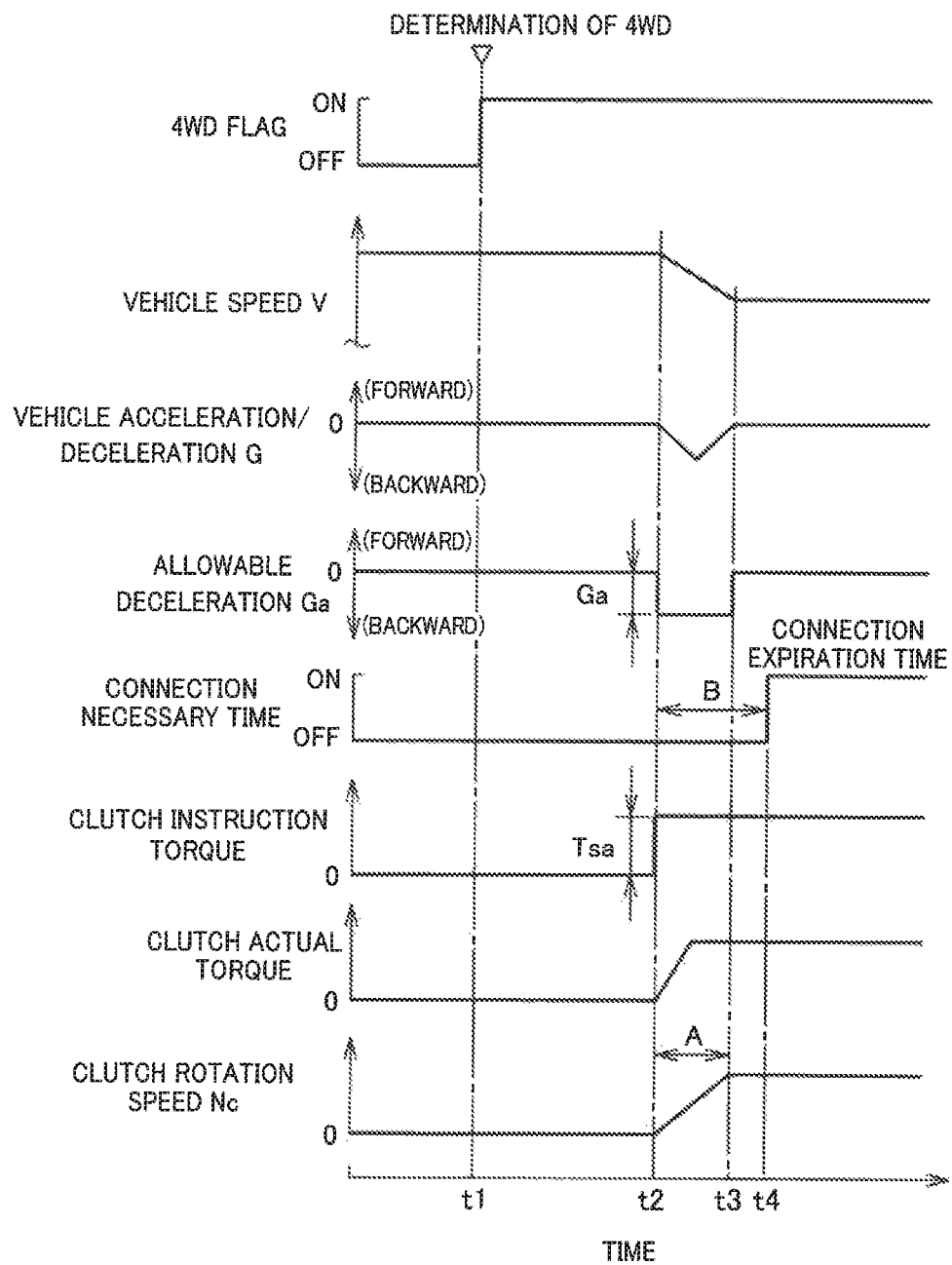
FIG. 9 is an example of a time chart for explaining changes in an operating state of the portions when 2-to-4 switching control is provided according to the flowchart of FIG. 6.

FIG. 9 is an example of a time chart for explaining changes in the operating state of the portions of the vehicle 8 when the 2-to-4 switching control, i.e., the connect control of engaging both the front-wheel-drive clutch 50 and the front-side clutch 36, is provided according to the flowchart of FIG. 6, showing the case of constant speed running at the vehicle acceleration/deceleration G of substantially zero. A "4WD flag" in FIG. 9 changes from OFF to ON according to a 2-to-4 switching determination of switching from the H2 running mode to the H4 running mode, and time t1 of FIG. 9 is the time when the 2-to-4 switching determination is made so that the determination of S1 becomes YES (affirmative). A "connection necessary time" in FIG. 9 denotes a time limit of completion of the connecting, and a connection expiration time t4 is the time when the second synchronization time B calculated at S7 has elapsed from the start time t2 of the connect control. A "clutch instruction torque" and a "clutch actual torque" of FIG. 9 are related to the engagement torque of the front-wheel-drive clutch 50 and correspond to a command value and an actual torque of the motor torque of the electric motor 84, respectively. This time chart of FIG. 9 corresponds to the case where the determination of S8 is YES (affirmative), i.e., when the first synchronization time A is shorter than the second synchronization time B, and the 2-to-4 switching control is provided such that the clutch rotation speed Nc reaches the synchronous rotation speed within the first synchronization time A, or in other words, such that the deceleration of the vehicle 8 at the time of synchronous control becomes equal to the allowable deceleration Ga. Time t3 is the time when the clutch rotation speed Nc reaches the synchronous rotation speed and the determination of S11 becomes YES (affirmative), and the front-side clutch 36 is meshed and engaged at S12, so that a sequence of the 2-to-4 switching control is terminated.

As described above, in the drive mode switching device 10 of the four-wheel-drive vehicle 8 of this example, when the H2 running mode of performing the two-wheel-drive running mode is switched to the H4 running mode of performing the four-wheel-drive running mode, the acceleration/deceleration adaptive synchronization portion 242 sets the allowable deceleration Ga based on the vehicle acceleration/deceleration G to control the engagement torque of the front-wheel-drive clutch 50 such that the deceleration of the vehicle 8 becomes equal to the allowable deceleration Ga at the time of the synchronous control of increasing the rotation speed of the front propeller shaft 24 etc., and therefore, the synchronous control is properly provided according to the vehicle acceleration/deceleration G.

Specifically, as shown in FIG. 7, the allowable deceleration Ga is set according to the map defined in advance such that the allowable deceleration Ga increases when the vehicle acceleration/deceleration G is large as compared to when the vehicle acceleration/deceleration G is small, so that the allowable deceleration Ga is reduced during the constant speed running at the substantially constant vehicle speed V and the front-wheel-drive clutch 50 is controlled according to the synchronous engagement torque Tsa to make the deceleration of the vehicle 8 smaller at the time of the synchronous control, and therefore, the deceleration shock attributable to a change in the vehicle acceleration/deceleration G is reduced, leading to an improvement in drivability, and the driver is less likely to feel discomfort. When the allowable deceleration Ga is small, the synchronization time, i.e., the time required for shifting to the H4 running mode, becomes long; however, since the urgency of shifting to the H4 running mode is generally low during the constant speed running, it is considered that an increase in the synchronization time is less problematic. On the other hand, since the allowable deceleration Ga is increased at the time of sudden acceleration/deceleration of the vehicle 8 when the driver hardly perceives the deceleration shock so that the switching to the H4 running mode is promptly made due to a shortened synchronization time, the disturbance of the vehicle behavior attributable to a slip etc. can quickly be eliminated, and an excellent drive power performance can be ensured. When the allowable deceleration Ga increases, the deceleration shock at the time of the synchronous control accordingly becomes larger; however, since the original vehicle acceleration/deceleration G is large, the driver is less likely to feel discomfort.

since the engagement torque control (S9) of the front-wheel-drive clutch 50 based on the vehicle acceleration/deceleration G by the acceleration/deceleration adaptive synchronization portion 242 is terminated under a predetermined condition (determination of NO at S8) at the time of a slip of the rear wheels 16L, 16R serving as the main drive wheels, and the engagement torque of the front-wheel-drive clutch 50 is controlled to synchronize the front-side clutch 36 in the second synchronization time B prioritizing the behavior stabilization of the vehicle 8, this can prevent the synchronization time, i.e., the time required for shifting to the H4 running mode, from becoming longer at the time of a slip of the rear wheels 16L, 16R, and the vehicle behavior from becoming unstable due to lengthening of the slip state. Specifically, the first synchronization time A is calculated for synchronizing the front side clutch 36 through the engagement torque control by the acceleration/deceleration adaptive synchronization portion 242 while the second synchronization time B necessary for behavior stabilization of the vehicle 8 is set based on the vehicle acceleration/deceleration G from the map of FIG. 8, and if the second synchronization time B is shorter than the first synchronization time A, the engagement torque of the clutch 50 is controlled to synchronize the front-side clutch 36 within the second synchronization time B (S10). This can properly prevent the synchronization time, i.e., the time required for shifting to the H4 running mode, from becoming longer at the time of a slip of the rear wheels 16L, 16R, and the vehicle behavior from becoming unstable due to lengthening of the slip state.

The four-wheel-drive vehicle 8 of this example has the rear-wheel-side output shaft 44 disposed parallel with the front-wheel-side output shaft 52 and the front propeller shaft 24 along the front-back direction of the vehicle, and the power is transmitted through the drive gear 46, the front-wheel-drive chain 56, and the driven gear 54 from the rear-wheel-side output shaft 44 to the front-wheel-side output shaft 52, while the front-wheel-drive clutch 50 is disposed between the drive gear 46 and the rear-wheel-side output shaft 44, and the front-side clutch 36 is disposed between the front-wheel differential gear device 28 distributing the torque of the front propeller shaft 24 to the left and right front wheels 14L, 14R and the right front wheel 14R. Therefore, when the H2 running mode is switched to the H4 running mode, the drive gear 46, the front-wheel-drive chain 56, the driven gear 54, the rear-wheel-side output shaft 44, the front propeller shaft 24, and the front-wheel differential gear device 28 must rotationally be driven by the engagement torque of the front-wheel-drive clutch 50, and the inertia thereof may cause a significant deceleration shock. In contrast, in this example, the allowable deceleration Ga is set based on the vehicle acceleration/deceleration G at the start of switching of the running mode by the acceleration/deceleration adaptive synchronization portion 242, and the engagement torque of the front-wheel-drive clutch 50 is controlled such that the deceleration of the vehicle 8 becomes equal to the allowable deceleration Ga at the time of the synchronous control of increasing the rotation speed of the front propeller shaft 24 etc., and therefore, while the deceleration shock is suppressed during the constant speed running at the small vehicle acceleration/deceleration G to improve the drivability, the synchronization time is shortened by the large allowable deceleration Ga at the time of sudden acceleration/deceleration of the vehicle 8 with a large vehicle acceleration/deceleration G so that the shift to the H4 running mode can promptly be made to stabilize the vehicle behavior, i.e., the synchronous control is properly provided according to the vehicle acceleration/deceleration G.

Figure 10:
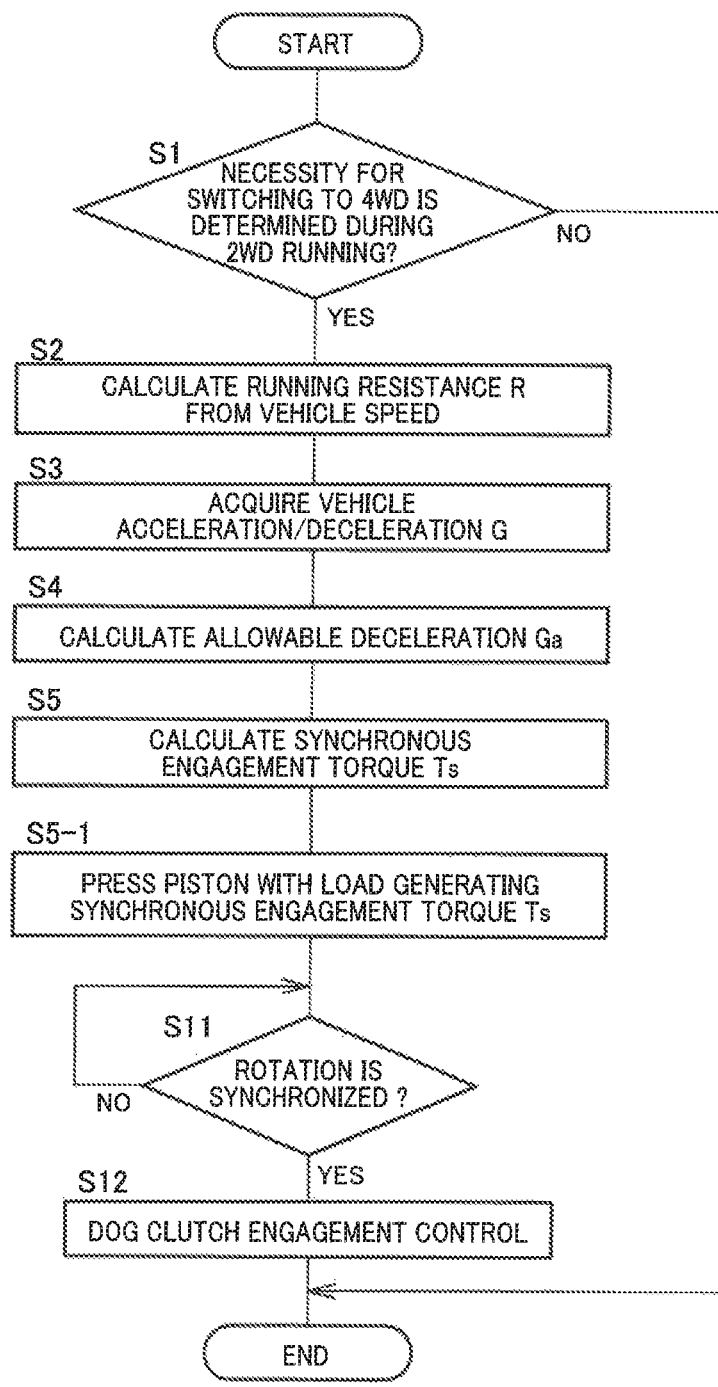
FIG. 10 is a diagram for explaining another example of the present invention and is a flowchart corresponding to FIG. 6.

Although the behavior stabilization priority synchronization portion 244 is included in the example, the portion 244 may not be included as shown in a flowchart of FIG. 10. The flowchart of FIG. 10 is executed by the four-wheel switching control portion 240 instead of the flowchart of FIG. 6, and S2 to S5 and S5-1 correspond to a function of the acceleration/deceleration adaptive synchronization portion 242. Therefore, in this example, after calculating the synchronous engagement torque Ts at S5, S5-1 is executed to output the motor drive command signal Sm for controlling the motor torque of the electric motor 84 such that the piston 82 is pressed with a load causing engagement of the front-wheel-drive clutch 50 at the synchronous engagement torque Ts. As a result, the synchronous control is provided to increase the rotation speed of the front propeller shaft 24 etc. such that the deceleration of the vehicle 8 becomes equal to the allowable deceleration Ga. Also in this example, the synchronous control is properly provided by the acceleration/deceleration adaptive synchronization portion 242 according to the vehicle acceleration/deceleration G. When the allowable deceleration Ga is calculated at S4 or the synchronous engagement torque Ts is calculated at S5, a correction etc. for stabilizing the vehicle behavior can be performed depending on a vehicle state such as a slip of the rear wheels 16.

Figure 11:
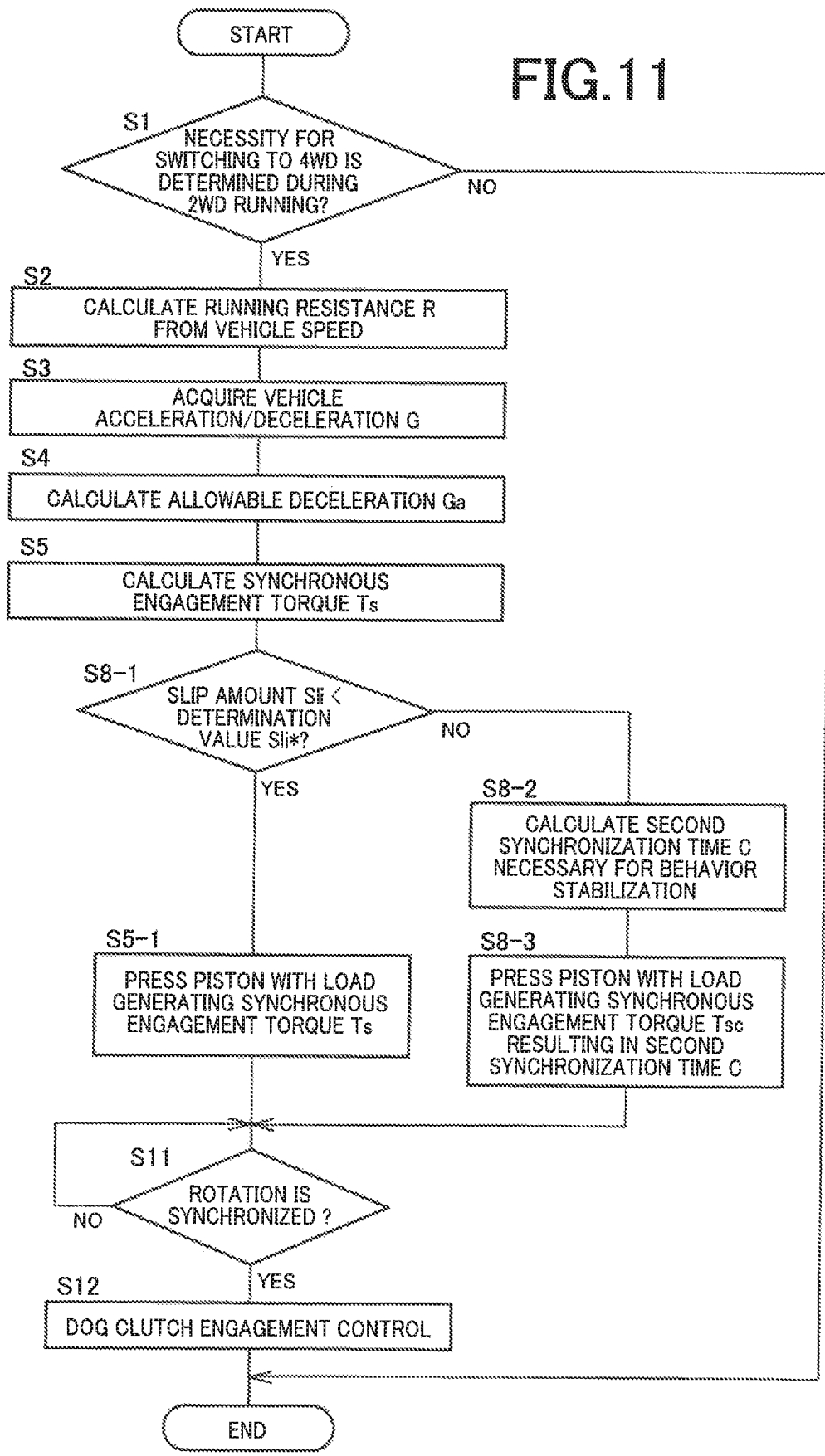
FIG. 11 is a diagram for explaining still another example of the present invention and is a flowchart corresponding to FIG. 6.

FIG. 11 is a flowchart for explaining another example of the present invention, and as compared to the flowchart of FIG. 10, S5 is followed by a determination of S8-1, and if the determination is NO (negative), S8-2 and S8-3 are executed. Therefore, it is determined whether both of the rear wheels 16L, 16R serving as the main drive wheels have a slip amount Sli smaller than a predefined determination value Sli*, and if Sli<Sli* is satisfied, S5-1 and subsequent steps are executed, or if at least one of the paired rear wheels 16L, 16R has the slip amount Sli equal to or larger than the determination value Sli*, S8-2 and S8-3 are executed. The slip amount Sli is a difference (rotation speed difference) between the vehicle speed V and the wheel speeds Nwrl, Nwrr of the rear wheels 16L, 16R. At S8-2 executed in the case of the slip state in which the slip amount Sli is equal to or larger than the determination value Sli*, for example, similarly to S7 of FIG. 6, a second synchronization time C necessary for the behavior stabilization is calculated from the map etc. predefined by using the vehicle acceleration/deceleration q, the slip amount Sli, or the vehicle speed V etc. as a variable. The second synchronization time C may be the same as the second synchronization time B calculated at S7 or may be defined as a different value. At S8-3, similarly to S10 of FIG. 6, the engagement torque of the front-wheel-drive clutch 50 is controlled to synchronize the front-side clutch 36 within the second synchronization time C. S8-1 to S8-3 correspond to another form of the behavior stabilization priority synchronization portion 244, and the same effects as the first example can be obtained. Instead of calculating the second synchronization time C, a synchronization speed or an engagement torque of the front-wheel-drive clutch 50 may be set, and the engagement torque of the front-wheel-drive clutch 50 may be controlled to synchronize the front-side clutch 36 at the synchronization speed or the engagement torque, or in other words, to increase the clutch rotation speed Nc to the synchronous rotation speed.

Although the examples of the present invention have been described in detail with reference to the drawings, these are merely an embodiment, and the present invention can be implemented in variously modified and improved forms based on the knowledge of those skilled in the art.

REFERENCE SIGNS LIST

8: Four-wheel-drive vehicle 10: Drive mode switching device 12: Engine (Drive power source) 14L, 14R: Front wheels (Auxiliary drive wheels) 16L, 16R: Rear wheels (Main drive wheels) 24: Front propeller shaft (Transmission member, Second transmission shaft) 28: Front-wheel differential gear device 36: Front-side clutch (Second connecting/disconnecting device, Dog clutch) 44: Rear-wheel-side output shaft (First transmission shaft) 46: Drive gear 50: Front-wheel-drive clutch (First connecting/disconnecting device, Friction engagement clutch) 52: Front-wheel-side output shaft (Transmission member, Second transmission shaft) 54: Driven gear 56: Front-wheel-drive chain 200: Electronic control device 240: Four-wheel switching control portion 242: Acceleration/deceleration adaptive synchronization portion 244: Behavior stabilization priority synchronization portion S6: First synchronization time calculating portion S7: Second synchronization time setting portion G: Acceleration/deceleration of a vehicle Ga: Allowable deceleration A: First synchronization time B, C: Second synchronization time

What is claimed is:

1. A drive mode switching device of a four-wheel-drive vehicle applied to a four-wheel-drive vehicle having a pair of left and right main drive wheels to which power of a drive power source is transmitted and a pair of left and right auxiliary drive wheels to which a portion of the power of the drive power source is transmitted via a transmission member during four-wheel-drive running mode, the drive mode switching device comprising:
a first connecting/disconnecting device connecting and disconnecting power transmission between the drive power source and the transmission member and a second connecting/disconnecting device connecting and disconnecting power transmission between the transmission member and the auxiliary drive wheels such that one of the first and second connecting/disconnecting devices is a friction engagement clutch capable of adjusting an engagement torque and the other is a dog clutch, and
a four-wheel switching control portion configured to control the engagement torque of the friction engagement clutch when switching to four-wheel-drive running mode, in which four wheels including the auxiliary drive wheels are driven, and during two-wheel-drive running mode, in which only the main drive wheels are rotationally driven with both the friction engagement clutch and the dog clutch disconnected, and to thereby increase a rotation speed of the transmission member to connect the dog clutch after synchronization in which a differential rotation of the dog clutch becomes equal to or less than a predetermined value, wherein
the four-wheel switching control portion comprises an acceleration/deceleration adaptive synchronization portion configured to set an allowable deceleration based on a vehicle acceleration/deceleration that is at least one of acceleration and deceleration of the vehicle and to control an engagement torque of the friction engagement clutch to make the deceleration of the vehicle equal to the allowable deceleration when the rotation speed of the transmission member is increased, and
the acceleration/deceleration adaptive synchronization portion is configured to set the allowable deceleration to a higher value when the vehicle acceleration/deceleration is higher and to a lower value when the vehicle acceleration/deceleration is lower.

2. The drive mode switching device of the four-wheel-drive vehicle according to claim 1, wherein
the four-wheel switching control portion comprises a behavior stabilization priority synchronization portion configured to terminate the engagement torque control of the friction engagement clutch by the acceleration/deceleration adaptive synchronization portion under a predetermined condition at a time of a slip of the main drive wheels and to control the engagement torque of the friction engagement clutch to synchronize the dog clutch in a synchronization time or a synchronization speed prioritizing behavior stabilization of the vehicle.

3. The drive mode switching device of the four-wheel-drive vehicle according to claim 2, wherein:
the behavior stabilization priority synchronization portion comprises:
a first synchronization time calculating portion configured to calculate a first synchronization time for synchronizing the dog clutch through the engagement torque control of the friction engagement clutch by the acceleration/deceleration adaptive synchronization portion, and
a second synchronization time setting portion configured to determine a second synchronization time necessary for behavior stabilization based on an operating state of the vehicle including the slip, and
when the second synchronization time is shorter than the first synchronization time, the behavior stabilization priority synchronization portion terminates the engagement torque control of the friction engagement clutch by the acceleration/deceleration adaptive synchronization portion and controls the engagement torque of the friction engagement clutch to synchronize the dog clutch in the second synchronization time.

4. The drive mode switching device of the four-wheel-drive vehicle according to claim 3, wherein:
a first transmission shaft transmitting the power of the drive power source to the main drive wheels and the transmission member are arranged parallel to each other along a front-back direction,
a drive gear is relatively rotatably disposed on the first transmission shaft while a driven gear coupled to the drive gear via a chain is relatively non-rotatably disposed on the transmission member,
the first connecting/disconnecting device is the friction engagement clutch and is disposed between the drive gear and the first transmission shaft and connects the transmission member via the first transmission shaft to the drive power source, and
the second connecting/disconnecting device is the dog clutch and is disposed between either of the left and right auxiliary drive wheels and a differential gear device distributing the rotation of the transmission member to the left and right auxiliary drive wheels.

5. The drive mode switching device of the four-wheel-drive vehicle according to claim 2, wherein:
a first transmission shaft transmitting the power of the drive power source to the main drive wheels and the transmission member are arranged parallel to each other along a front-back direction,
a drive gear is relatively rotatably disposed on the first transmission shaft while a driven gear coupled to the drive gear via a chain is relatively non-rotatably disposed on the transmission member,
the first connecting/disconnecting device is the friction engagement clutch and is disposed between the drive gear and the first transmission shaft and connects the transmission member via the first transmission shaft to the drive power source, and
the second connecting/disconnecting device is the dog clutch and is disposed between either of the left and right auxiliary drive wheels and a differential gear device distributing the rotation of the transmission member to the left and right auxiliary drive wheels.

6. The drive mode switching device of the four-wheel-drive vehicle according to claim 1, wherein:
a first transmission shaft transmitting the power of the drive power source to the main drive wheels and the transmission member are arranged parallel to each other along a front-back direction,
a drive gear is relatively rotatably disposed on the first transmission shaft while a driven gear coupled to the drive gear via a chain is relatively non-rotatably disposed on the transmission member,
the first connecting/disconnecting device is the friction engagement clutch and is disposed between the drive gear and the first transmission shaft and connects the transmission member via the first transmission shaft to the drive power source, and
the second connecting/disconnecting device is the dog clutch and is disposed between either of the left and right auxiliary drive wheels and a differential gear device distributing the rotation of the transmission member to the left and right auxiliary drive wheels.

* * * * *